(12) United States Patent
Eastham

(10) Patent No.: US 8,400,044 B2
(45) Date of Patent: Mar. 19, 2013

(54) ELECTROMOTIVE MACHINES

(75) Inventor: John Frederick Eastham, Bath (GB)

(73) Assignee: Force Engineering Limited, Leics (GB)

( * ) Notice: Subject to any disclaimer, the term of this patent is extended or adjusted under 35 U.S.C. 154(b) by 288 days.

(21) Appl. No.: 12/311,774

(22) PCT Filed: Oct. 10, 2007

(86) PCT No.: PCT/GB2007/003851
§ 371 (c)(1),
(2), (4) Date: Jan. 12, 2010

(87) PCT Pub. No.: WO2008/044020
PCT Pub. Date: Apr. 17, 2008

(65) Prior Publication Data
US 2010/0117479 A1 May 13, 2010

(30) Foreign Application Priority Data

Oct. 10, 2006 (GB) .................................. 0620069.5

(51) Int. Cl.
*H02K 1/22* (2006.01)
*H02K 17/00* (2006.01)
*H02K 41/02* (2006.01)

(52) U.S. Cl. ........ 310/266; 310/166; 310/198; 310/112; 310/12.15; 310/268

(58) Field of Classification Search .................. 310/266, 310/268, 112, 114
See application file for complete search history.

(56) References Cited

U.S. PATENT DOCUMENTS 4,095,150 A * 6/1978 Senckel ...................... 310/12.24
(Continued)

FOREIGN PATENT DOCUMENTS

DE 101 37 192 2/2003
EP 1 220 426 7/2002
(Continued)

OTHER PUBLICATIONS

PCT International Search Report and Written Opinion dated Feb. 21, 2008 in related PCT Application No. PCT/GB2007/003851.
PCT International Preliminary Report on Patentability dated Apr. 15, 2009 in related PCT Application No. PCT/GB2007/003851.
UK Patent Office Search Report dated Feb. 1, 2007 in related UK Patent Application No. GB0620069.5.

(Continued)

*Primary Examiner* — Quyen Leung
*Assistant Examiner* — Thomas Truong
(74) *Attorney, Agent, or Firm* — Stout, Uxa, Buyan & Mullins; Frank J. Uxa

(57) ABSTRACT

An electromotive machine (200, 900) comprises a rotor (230; 800; 920) and a stator (210, 220; 500; 600; 700; 910, 920). The stator (210, 220; 500; 600; 700; 910, 920) comprises a first group of primary windings (260a, 240b, 240d; 520; 640a, 640b, 650a, 650b, 660a, 660b; 930a, 930b, 933a, 933b, 937a, 937b), which are concentrated windings, arranged on a first side of the rotor (230; 800; 920) and a second group of primary windings (240a, 250a, 240c; 530; 740a, 740b, 750a, 750b, 760a, 760b; 941a, 941b, 943a, 943b, 947a, 947b) that are concentrated windings arranged on a second, opposite, side of the rotor (230; 800; 920). The primary windings of each group comprise a plurality of coils that, in use, are supplied with current and produce a magnetic field. The windings of the second group (240a, 250a, 240c; 530; 740a, 740b, 750a, 750b, 760a, 760b; 941a, 941b, 943a, 943b, 947a, 947b) are displaced, relative to the windings of the first group (260a, 240b, 240d; 520; 640a, 640b, 650a, 650b, 660a, 660b; 930a, 930b, 933a, 933b, 937a, 937b) in order to cancel out an n-pole component of the magnetic field.

21 Claims, 20 Drawing Sheets

U.S. PATENT DOCUMENTS

| | | | |
|---|---|---|---|
| 4,370,577 A * | 1/1983 | Wakabayashi et al. | 310/12.24 |
| 4,573,003 A | 2/1986 | Lipo | |
| 4,677,332 A | 6/1987 | Heyraud | |
| 4,870,306 A * | 9/1989 | Petersen | 310/12.31 |
| 5,744,895 A * | 4/1998 | Seguchi et al. | 310/266 |
| 5,751,089 A * | 5/1998 | Stridsberg | 310/266 |
| 5,955,808 A * | 9/1999 | Hill | 310/180 |
| 6,429,611 B1 * | 8/2002 | Li | 318/115 |
| 6,819,026 B2 * | 11/2004 | Narita et al. | 310/266 |
| 6,844,656 B1 * | 1/2005 | Larsen et al. | 310/268 |
| 6,867,525 B2 * | 3/2005 | Ionel et al. | 310/156.47 |
| 7,723,888 B2 * | 5/2010 | Petek | 310/156.35 |
| 7,902,712 B2 * | 3/2011 | Nakamasu et al. | 310/156.57 |
| 7,982,352 B2 * | 7/2011 | Nymann et al. | 310/156.32 |
| 2003/0085627 A1 | 5/2003 | Lipo et al. | |
| 2003/0117026 A1 | 6/2003 | Korenaga | |
| 2004/0070307 A1 | 4/2004 | Haugan et al. | |

FOREIGN PATENT DOCUMENTS

| | | |
|---|---|---|
| JP | 62-207185 | 9/1987 |
| JP | 3-245755 | 11/1991 |
| JP | 2005-110373 | 4/2005 |
| JP | 2005-269707 | 9/2005 |
| JP | 2006-54984 | 2/2006 |
| WO | WO 2005/117243 | 12/2005 |
| WO | WO 2006092924 A1 * | 9/2006 |

OTHER PUBLICATIONS

Toliyat et al., "Analysis of a Concentrated Winding Induction Machine for Adjustable Speed Drive Applications Part 2 (Motor Design and Performance)", *IEEE Transactions on Energy Conversion*, vol. 6, No. 4, pp. 684-692, Dec. 1991.

Libert et al., "Investigation on Pole-Slot Combinations for Permanent-Magnet Machines with Concentrated Windings", paper presented at International Conference on Electrical Machines (ICEM'04), Department of Electrical Machines and Power Electronics, Royal Institute of Technology, Stockholm, Sweden, 2004.

Eastham, J.F., "Novel synchronous machines: linear and disc", *IEE Proceedings*, vol. 137, Pt. B, No. I, pp. 49-58, Jan. 1990.

Tenca et al., "Analysis and Modeling of Future Electrical Propulsion and Launch Systems at the University of Wisconsin-Madison", 2005 IEEE Electric Ship Technologies Symposium, Philadelphia.

"Theory of Linear Induction Motors", pp. 124-129, Yamamura S. University of Tokyo Press, 1972.

Sanders, Robert M., *Fellow IEEE*, "Electromechanical Energy Conversion in Double Cylindrical Structures", Oct. 1963, pp. 631-638. Best available copy.

J.F. Eastham, M.Sc., Ph.D., "Close-ratio phase-modulated change-pole machines with improved winding balance", *Proc. IEE*, vol. 115, No. 11, Nov. 1968, pp. 1641-1648. Best available copy.

\* cited by examiner

PRIOR ART
Fig.3
(a)
(b)
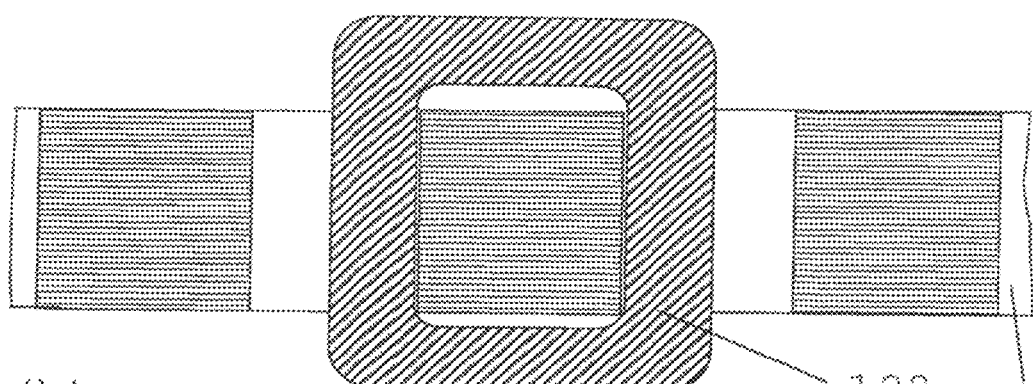
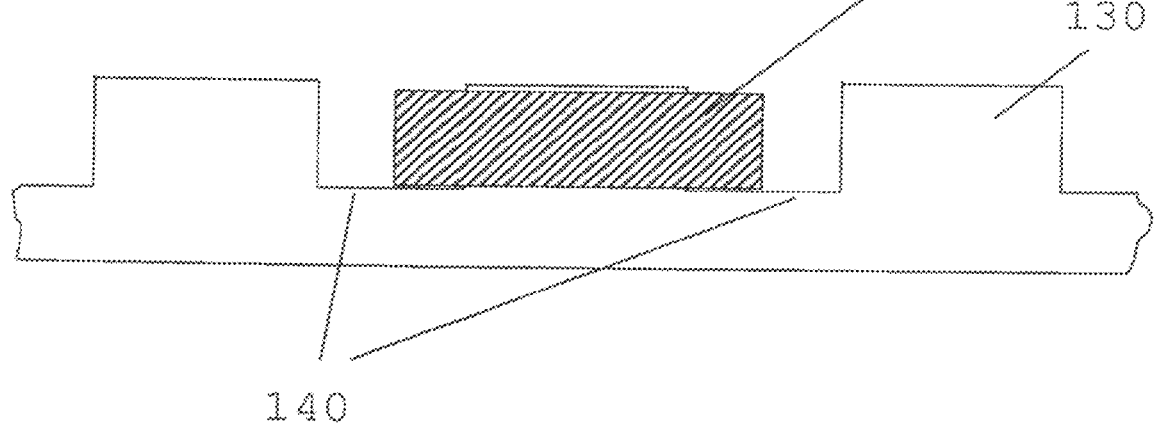
120
130
140

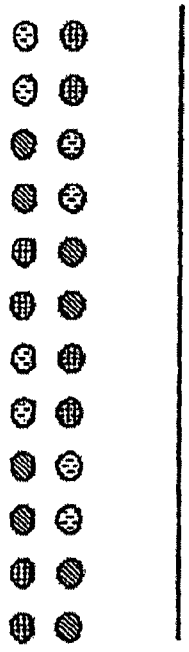 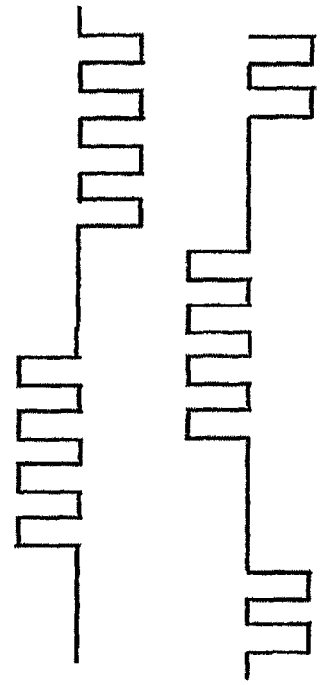 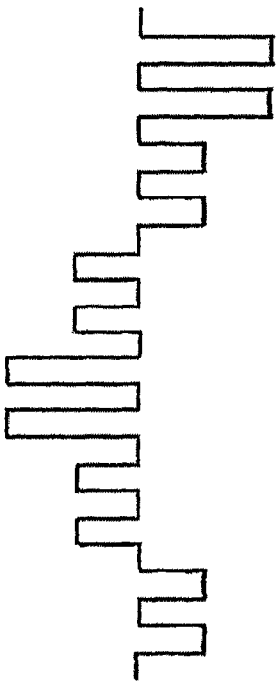
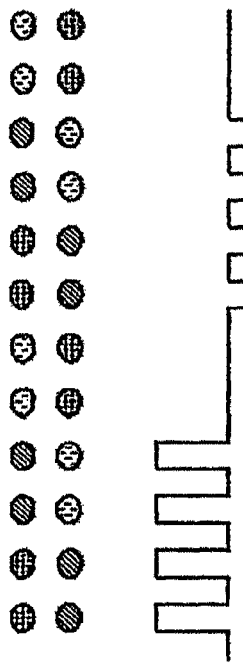 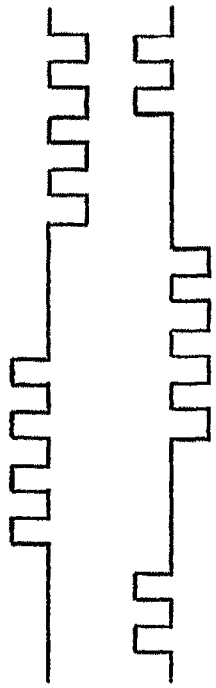 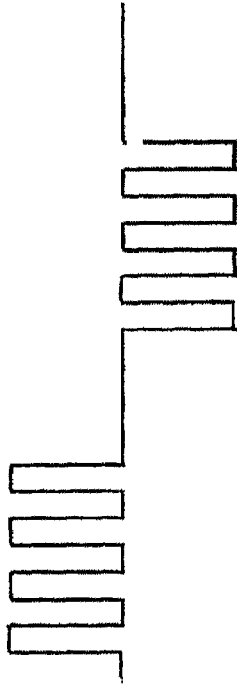
PRIOR ART
Fig. 5

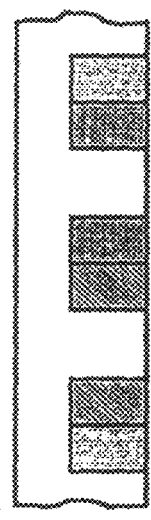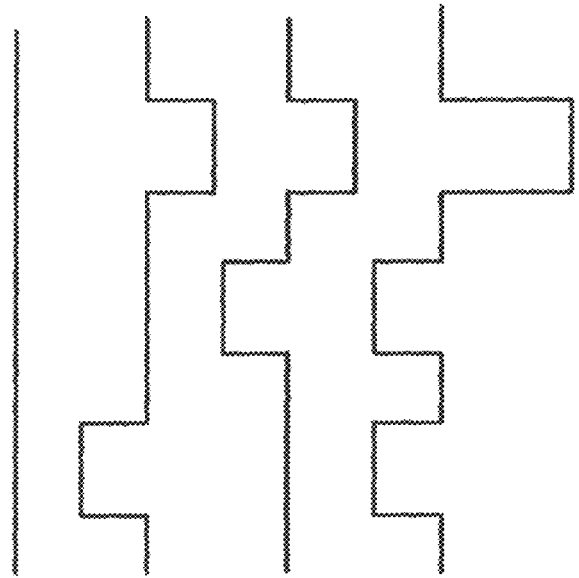
PRIOR ART
Fig. 6
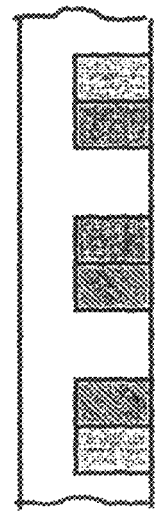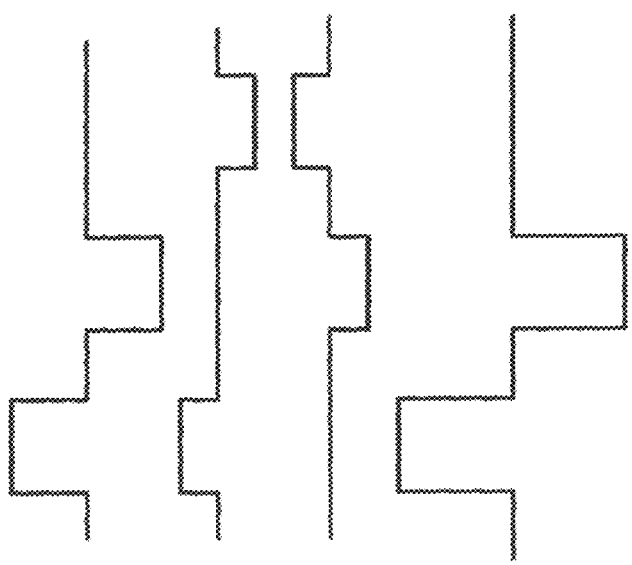

PRIOR ART
Fig. 7
(a)
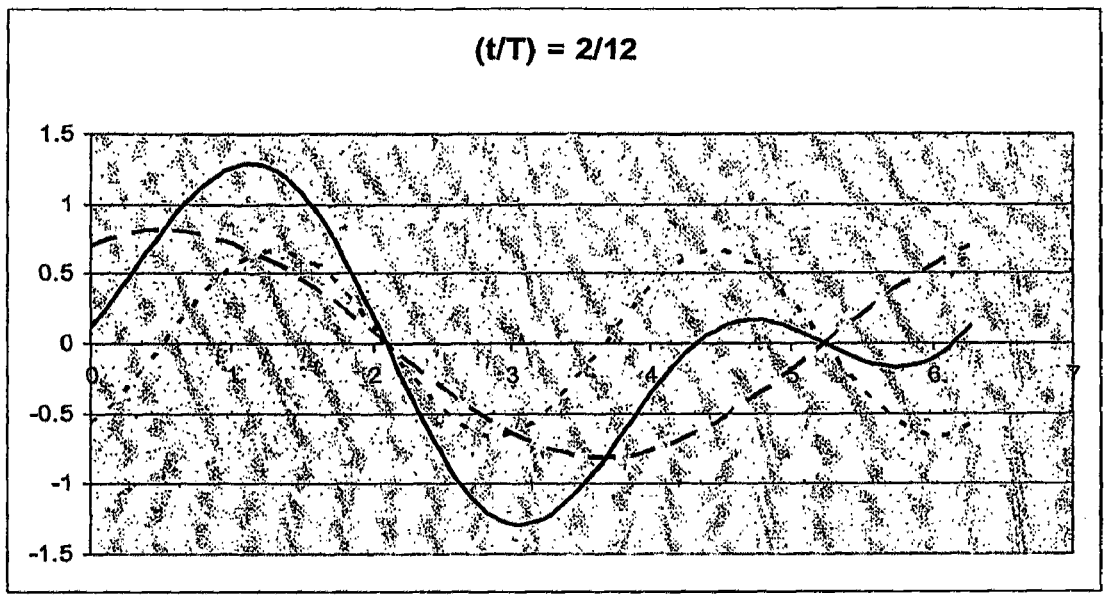
(b)
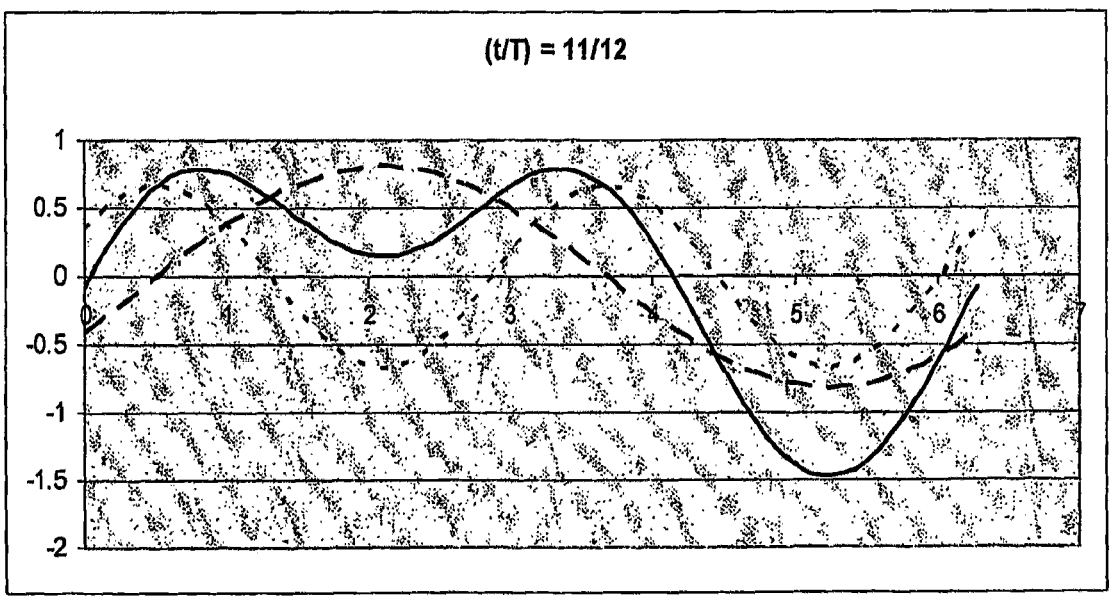

Fig. 8
200
(d)
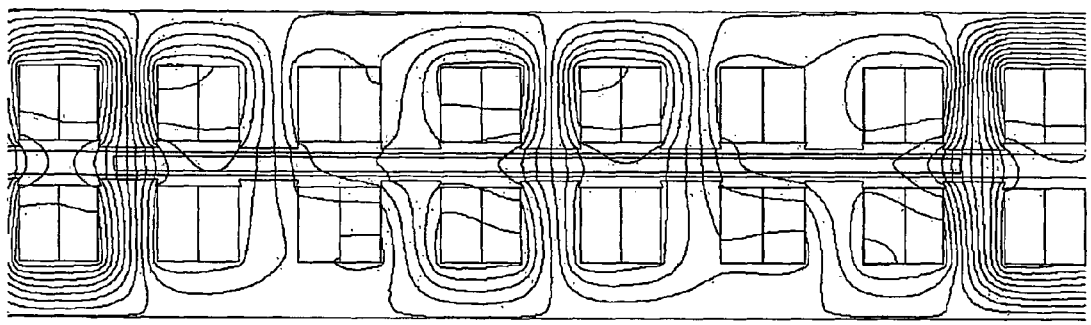
(e)
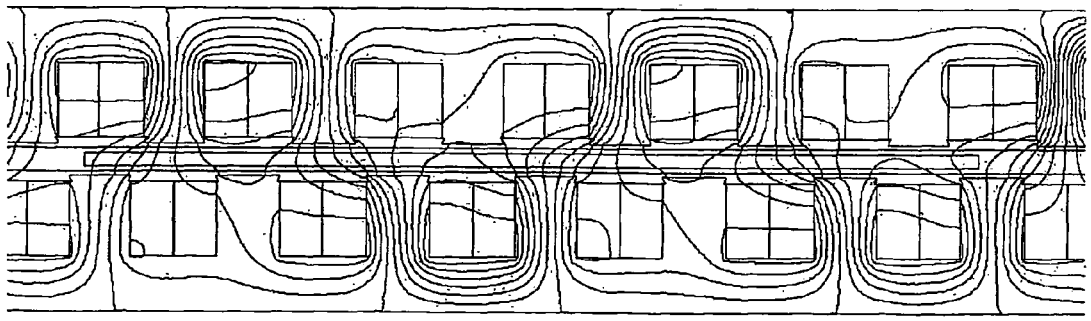

(h)

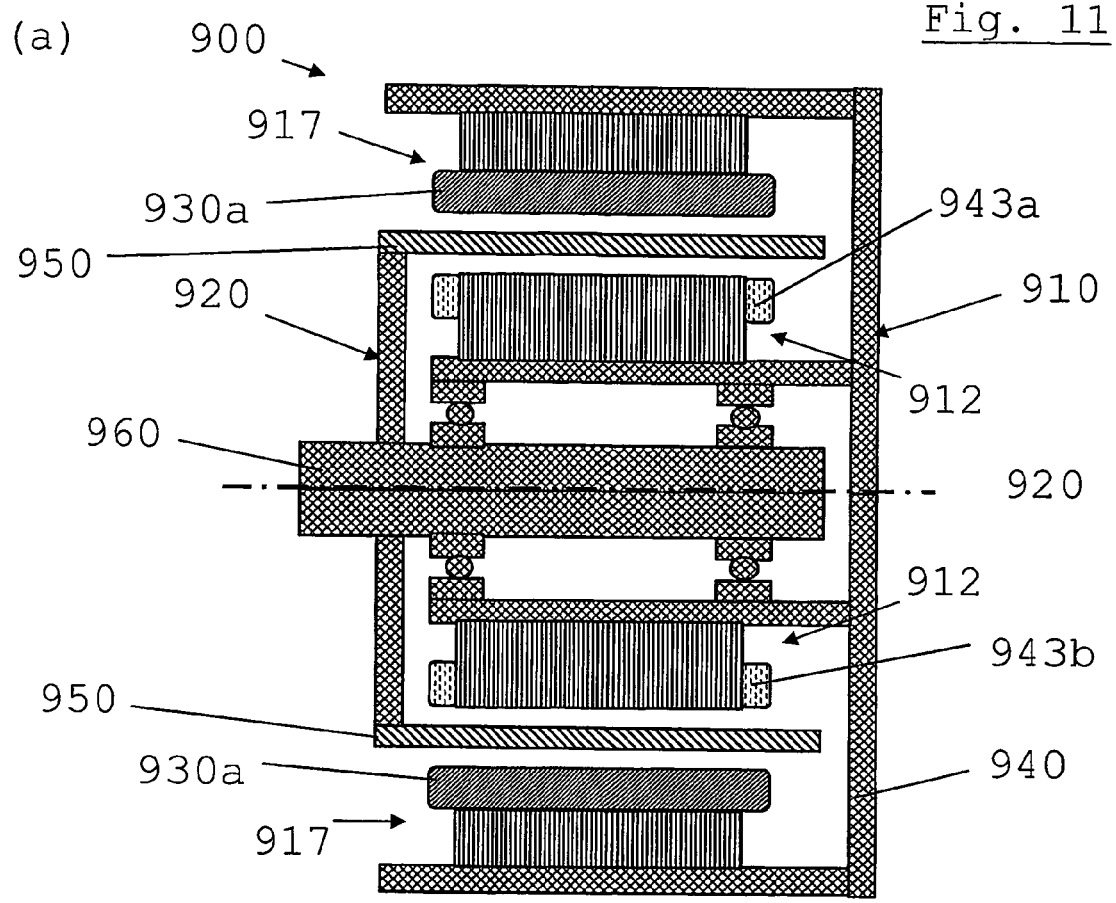
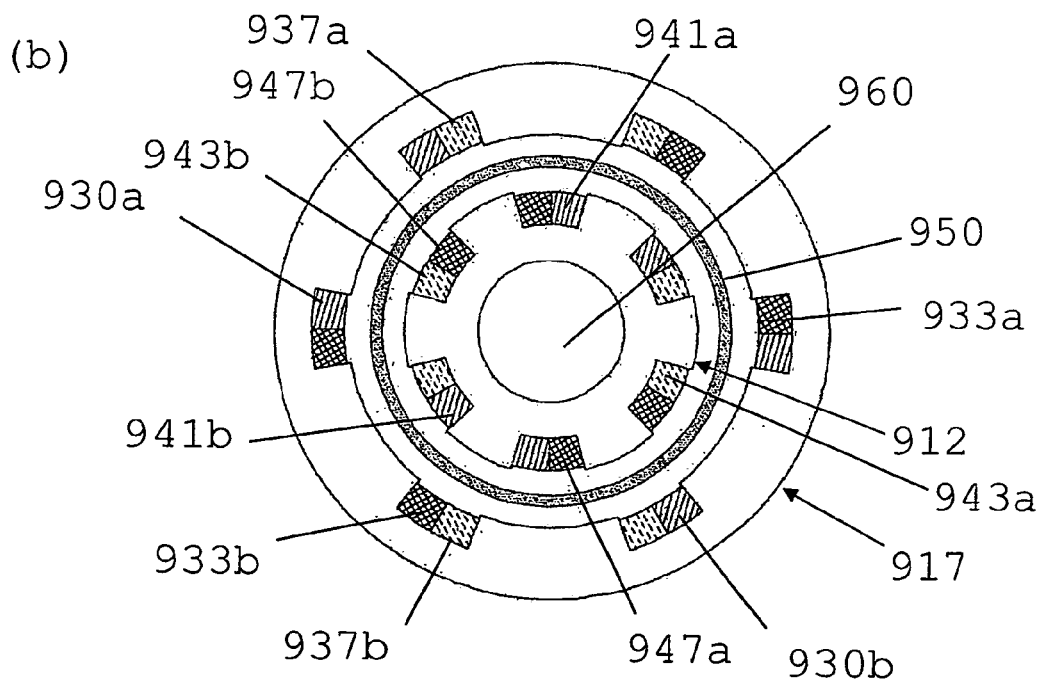
Fig. 11

Fig. 12
(a)
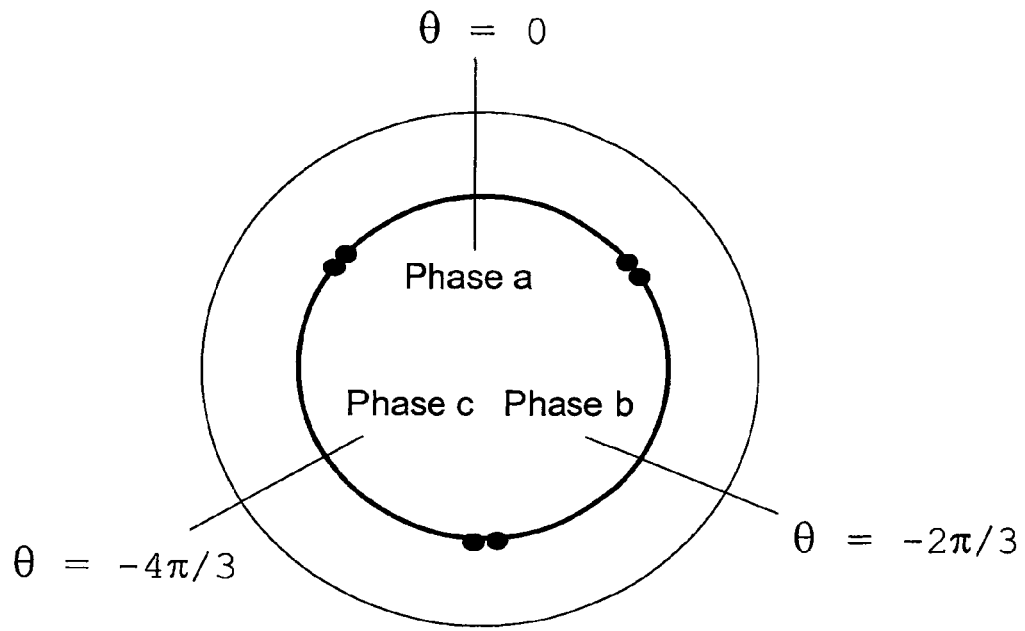
(b)
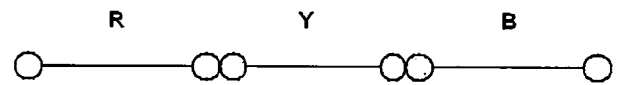
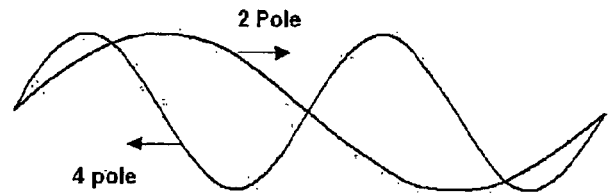
(c)
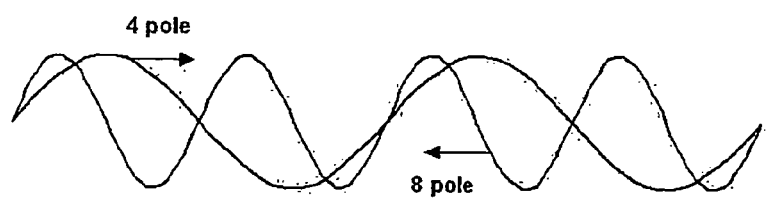

(a)
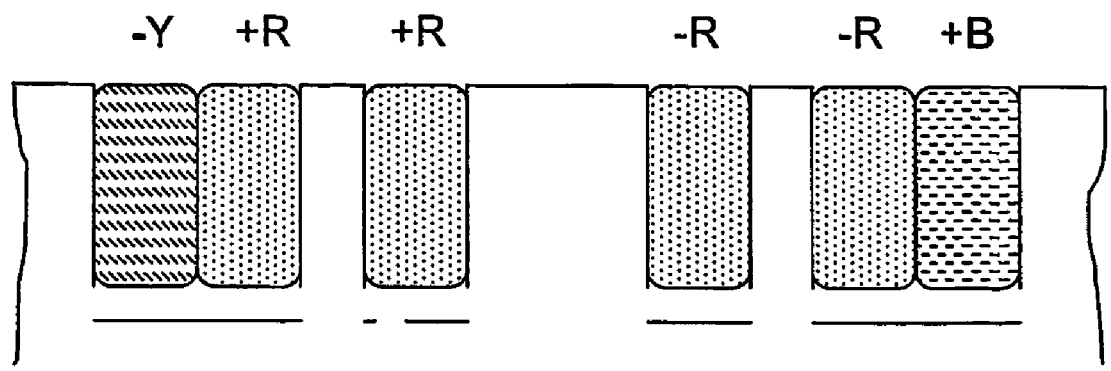
(b)
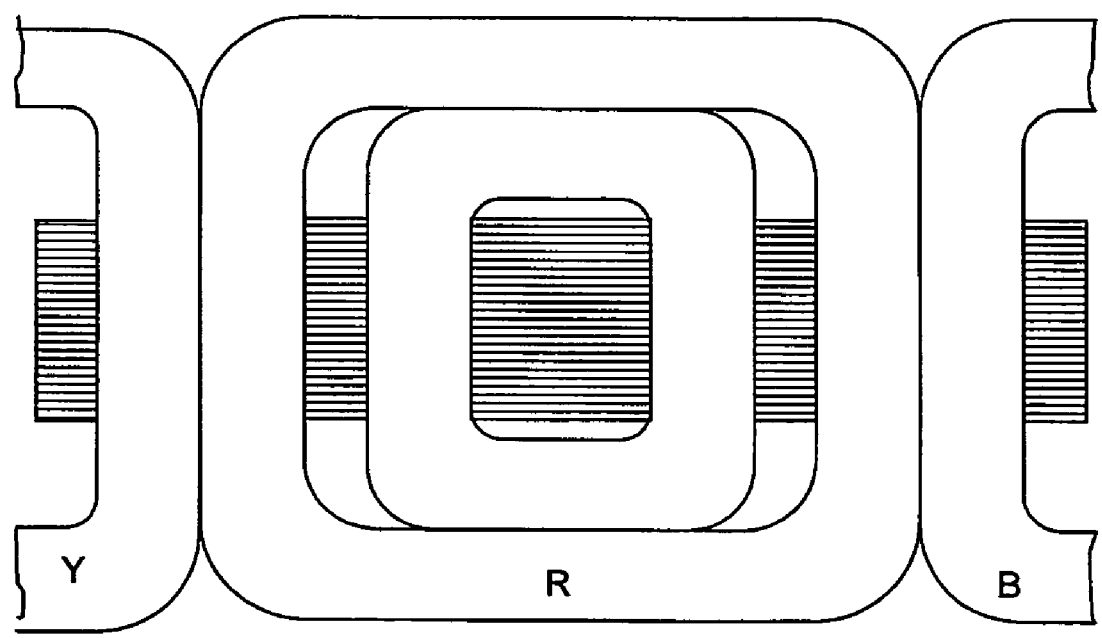
Fig. 14

ELECTROMOTIVE MACHINES

FIELD OF THE INVENTION

The present invention relates to the field of electromotive machines. More particularly the invention relates to electric motors and generators comprising a stator having concentrated primary windings.

BACKGROUND ART

As is well known, when an electric motor is driven by an external means, so that the motor's rotor is moved sufficiently quickly relative to its stator, the motor will normally act as a generator of electricity. Equivalently, when sufficient current is supplied to a generator, its rotor will normally move relative to its stator, and the generator will act as a motor. In view of that interchangeability of function, the term "electromotive machine" is used for convenience herein, to refer interchangeably to motors and/or generators.

The most well-known construction of electromotive machine comprises a moveable rotor which rotates inside a fixed, substantially cylindrical stator. The term "rotor" is used herein to describe the part of the electromotive machine that is moved, by an electromagnetic field in a motor, or to induce current in a generator. In some electromotive machines, the rotor does not rotate but rather is, for example, translated linearly. The stator is the fixed part of the machine that generates the driving electromagnetic field in a motor, or in which current is induced in a generator. The stator usually comprises a long length of insulated conductor, wound repeatedly to form a "primary winding". The winding is usually wound onto a ferrous core, for example a laminated steel core (although a ferrous core is not strictly necessary). A plurality of primary windings may be present in the stator.

The term "coil" is used to refer (i) to a conductor arranged in a slotted core, with a leading coil side in a first slot and a trailing coil side in a second slot, or (ii) in the context of a synchronous machine or dc machine, to a conductor arranged around a pole core. The terms "winding" and "windings" are used to refer to a set of coils; the term is often qualified: for example, "phase winding" means all of the coils connected to one phase.

Electromotive machines can be classified in a number of different ways. One way is by the shape of the stator: it may, for example, be planar (in a linear machine), a cylindrical tube or a disk. Linear machines are used in a wide variety of machines, for example in fairground rides, in baggage-handling machines, in urban transport (e.g. monorail) vehicles and in various other launch applications.

Another classification approach is by whether the stator is single or double, that is, whether there is a stator on one side of the rotor or on two opposite sides.

Another way of classifying a machine is by the form of its rotor (this is probably the most common approach to classification). There are essentially two broad classes of rotor: rotors comprising a permanent magnet and rotors comprising conductors. The former are found in synchronous electromotive machines and the later especially in induction electromotive machines. Wound rotors are also commonly found in synchronous machines: turbo-alternators and machines larger than a few kilowatts generally have wound rotors. The rotor (excitation) winding in a synchronous machine is supplied with D.C. current to produce the same sort of field (which is stationary with respect to the rotor) as a permanent magnet array.

Hybrid types of electromotive machines also exist, in which the rotor comprises both a permanent magnet and conductors. Conductors in a rotor themselves take various forms, for example a simple plate, a "squirrel cage" of interconnected bars, or windings of wires (known as secondary windings).

There are two main forms of (primary) windings in use in stators in small and medium-size machines. The first is double-layer windings, which are employed in induction motors and in some motors with permanent magnet excitation; those machines find use in general industrial applications. The second form of windings is concentrated windings, which are in general use only for motors with permanent magnet excitation; those machines are used for both general industrial applications and (notably) in computer hard-disk drives.

A coil 20 for a double layer winding is shown at FIG. 1. The coil 20 comprises an insulated, conductive wire, wound on a ferrous core 30. For ease of illustration, the stator 10 from a linear motor is shown. Ferrous core 30 includes a plurality of slots 40. The first or leading side 20a of the coil 20 occupies the top half of a slot 40a whilst the second side 20b is positioned in the bottom of a slot 40b one coil pitch away from the first side 20a. As successive coils 20 are positioned in the stator 10 in the manner of FIG. 2, the coils 20 at the ends of the stator 10 overlap, forming a quite bulky side region. FIG. 2 illustrates a stator for a four-pole linear motor; the difficulty of winding a linear machine is apparent: the winding has to terminate at each end and either half-filled slots 40c or coil sides 20c over the ends of the machine must be used (in FIG. 2 both techniques are illustrated, with two half empty slots 40c and two coils 20c outside the end of the machine; see FIG. 2(b)).

Coils 120 for a concentrated winding are shown in FIG. 3. The coil 120 again comprises an insulated, conductive wire, wound on a ferrous core 130. Ferrous core 130 includes a plurality of slots 140. The coils 120 are positioned in the slots 140 as shown in FIG. 4, which like FIG. 2 shows a four-pole linear motor. The concentrated windings 120 are each arranged adjacent to a neighbouring winding 120; in contrast with the double-wound case, adjacent coils do not overlap in the concentrated windings. Although other definitions are possible, a stator comprising concentrated windings is defined (as used herein) as a stator comprising a plurality of windings each arranged adjacent to, but not overlapping with, at least one other winding of the plurality.

The advantage of using this form of winding is immediately apparent. First, there is no coil overlap at the sides of the machine, leading to a larger active pole width for a given total machine width. Second, if open slots 140 are used, the coils 120 can be totally preformed and easily inserted in the slots 140, which leads to reduced labour costs. Finally, the winding produces no difficulties at the ends of the machine since all the slots 140 are filled and there are no coil sides around the ends; that latter point is particularly important when a long stator assembly (for, say, a launcher application) is needed, as stator modules that can be butted up to each other can be made.

FIG. 5 illustrates the slot current pattern for two pole pitches produced by a double layer winding (first the winding is shown and then the slot current patterns). The patterns are very approximately sinusoidal and are symmetrical about the zero line. From the symmetry it can be deduced algebraically that only odd harmonic fields can be present. Furthermore, if the slot currents from all the phases are added with the correct phase relationships, a travelling wave is produced. This can be seen qualitatively by drawing the total slot current at progressive times in the cycle, as shown in FIG. 5, where the field moves on by a ¼ of wavelength in space as time progresses by T/4 of a cycle. There are changes in the shape of the field between the two instants in time, which indicates that harmonic travelling fields are present.

A double-layer winding stator can be used with rotors comprising permanent magnets or conductors for induction. The largely sinusoidal nature of the magnetomotive force (mmf) driven by the slot currents is compatible with a good performance.

The behaviour of the concentrated winding is different and much larger harmonic fields are present. FIG. 6, which is drawn for the first two poles of the machine, illustrates the action. The slot current patterns produced are not symmetrical about the zero line, which means it can be deduced algebraically that both odd and even harmonics are present in the waveform. The travelling wave performance is again illustrated by showing patterns at two instants in time. The considerable change in shape between the two instants indicates that large travelling harmonic fields are present, and algebraic analysis confirms that, and shows that (amongst others) two large travelling fields are present. The first is the two-pole field that the winding is designed to produce and the second is a four-pole field travelling in the negative direction.

Analysis of the harmonics will now be described in more detail.

A single general machine winding which consists of a group of coils connected in series is equivalent to a set of windings, each consisting of a sinusoidal distribution of conductors, the distributions being harmonically related in space. The conductor distribution can then be expressed as a Fourier expansion with a zero average term. It can be assumed that the conditions in a machine are largely unaltered if the conductors and the slots are replaced by patches of infinitely thin conductors positioned on a plane iron surface. The patches of conductors are of the same width and placed in the same positions as the slot openings.

If a slot at $\theta_s$ contains $N_s$ conductors and has a slot opening of $2\delta$ then the conductor distribution produced by the slot is given by:

$$N_p = \frac{1}{\pi} \int_{\theta_s - \delta}^{\theta_s + \delta} \frac{Ns}{2\delta} \exp(-jp\theta_s) d\theta$$

$$N_p = \frac{1}{\pi} \frac{\sin p\delta}{p\delta} N_s \exp(-jp\theta_s)$$

where p is an integer, the harmonic number.

The winding distribution for say the 'a' phase of the winding is then given by $$N_{pa} = \frac{1}{\pi} \frac{\sin p\delta}{p\delta} \sum_{s=1}^{s=S} N_{sa} \exp(-jp\theta_{sa})$$

Where there are $N_{sa}$ conductors from the 'a' phase in the general s th slot at $\theta_{sa}$.

An example concentrated winding is shown on FIG. 12. If each of the coils has N turns then the 'a' phase distribution is:

$$N_{pa} = \frac{N}{\pi} \frac{\sin p\delta}{p\delta} \left( \exp j\theta - \exp \frac{j2\pi p}{3} \right)$$

-continued $$N_{pa} = \frac{2N}{\pi} \frac{\sin p\delta}{p\delta} \exp(-j\pi p/3) \exp(j\pi/2) \sin \pi p/3$$

This means that $N_{pa}$ is zero for p=3m where m is an integer.

The equivalent expressions for the other two phases 'b' and 'c' may be found by an origin shift hence if:

$$N_{pa} = N_p$$

then:

$$N_{pb} = N_p \exp(-2\pi p/3)$$

and:

$$N_{pc} = N_p \exp(-4\pi p/3)$$

The phase conductor distributions may be resolved into equivalent space sequence sets where $n_f$, $n_b$, and $n_z$ are the forward backward and zero components respectively. Then:

$$n_f = N_p/3\{\exp(j0) + \exp(-j2\pi p/3 + j2\pi/3) + \exp(-j4\pi p/3 + j4\pi/3)\}$$

and it follows that $n_f = N_p$ for p=1, 4, 7 etc and is zero for all other p.

$$n_b = N_p/3\{\exp(j0) + \exp(-j2\pi p/3 + j4\pi/3) + \exp(-j4\pi p/3 + j2\pi/3)\}$$

and it follows that $n_b = N_p$ for p=2, 5, 8 etc and is zero for all other p.

$$n_z = N_p/3\{\exp(j0) + \exp(-j2\pi p/3) + \exp(-j4\pi p/3)\}$$

the sum of the term in the brackets is zero unless p=3m where m is a positive integer. Therefore since it was deduced earlier that $N_p$ is zero when p=3m the zero sequence winding distribution is zero for all values of p.

When a positive sequence set of windings is fed with a balanced set of 3 phase currents a positive going field is produced, conversely when a negative sequence set of windings is fed with a balanced set of 3 phase currents a negative going field is produced. It follows that positive going waves are produced at p=1, 4, 7 and negative going waves are produced when p=2, 5, 8

The relative amplitudes of the waves is given by the factor:

$$\frac{\sin p\delta}{p\delta} \sin \pi p/3$$

The mark to space ratio of the slots and teeth is commonly 60:40, which means that $$\delta = 0.8\pi/3$$

for the 3 slot configuration analysed. Taking this value the magnitudes of the waves relative to the wave at p=1 are tabulated in Table 1 below.

A two-pole machine uses 3 coils as shown at FIG. 12(*b*) and produces a forward-going 2 pole wave and a backward-going 4 pole wave. A four pole machine is given by repeating the 3 coils of the 2 pole machine as shown in FIG. 12(*c*) and therefore produces a 4 pole forward going wave and a backward going eight pole wave. That has the effect of multiplying p for the 2-pole case by 2, i.e. the (forwards-travelling) fundamental in the 4-pole case corresponds to the (backwards-travelling) second-harmonic in the 2-pole case, with the direction of travel reversed. Therefore the large waves are 4-poles travelling in the positive direction and 8-poles travelling in the negative direction. It will be understood that 2L poles windings can be formed by repeating the 3 coils of FIG. 12(b) L times.

TABLE 1 relative magnitude of harmonic waves in the 2-pole and 4-pole cases.

| | p | | | | | | | | |
|---|---|---|---|---|---|---|---|---|---|
| | 1 | 2 | 3 | 4 | 5 | 6 | 7 | 8 | 9 |
| Direction | F | B | | F | B | | F | B | |
| Pole number two pole winding | 2 | 4 | 6 | 8 | 10 | 12 | 14 | 16 | 18 |
| Pole number four pole winding | 4 | 8 | 12 | 16 | 20 | 24 | 28 | 32 | 36 |
| Relative Magnitude | 1 | 0.669 | 0 | 0.07 | 0.233 | 0 | 0.078 | 0.0684 | 0 |

As an illustration of the concentrated windings' action, FIG. 7 shows the addition of a two-pole positively going wave (dashed line) and a four-pole negatively going wave (dotted line). Two instants of time are shown t=0 at FIGS. 7(a), and t=T/4 at 7(b). The total patterns (solid line) approximate in shape to the total slot currents in FIG. 6.

Concentrated windings have been found to be useful only for machines with permanent-magnet rotors, which can produce force only from a field that has the same pole number. That property enables the same concentrated winding to be used with different pole-number secondaries (i.e. rotors), for example, the winding of FIG. 4 could be used with a rotor having either four- or eight-pole permanent magnet arrays.

Attempts have been made to use concentrated windings in induction motors, but the results have been unsatisfactory. The conductors of an induction-motor rotor have been found to respond to and produce force from any harmonic of the stator field; consequently, a large negative force results from the backward going fields produced by concentrated windings, and that detracts from the wanted positive force.

An object of the invention is to provide an electromotive machine, having concentrated primary windings, in which problems associated with prior-art concentrated-primary-winding machines are ameliorated or eliminated.

DISCLOSURE OF THE INVENTION

In a first aspect, the invention provides an electromotive machine comprising a rotor and a stator, the stator comprising: (i) a first group of primary, concentrated windings, arranged on a first side of the rotor; and (ii) a second group of primary, concentrated windings, arranged on a second, opposite, side of the rotor; wherein the primary windings of each group comprise a plurality of coils which, in use, produce a magnetic field; characterised in that the coils of the second group are in a displaced position relative to the coils of the first group, so that corresponding coils of each group are not aligned and an n-pole harmonic of the magnetic field is substantially cancelled, where n is a positive, even integer.

Thus the second group of windings is arranged so that the component of its magnetic field attributable to the n-pole harmonic destructively interferes with the same harmonic of the magnetic field of the first group of windings. That can be achieved in either of two ways: first, the second group of windings may be offset by half a wavelength (or an odd multiple of half a wavelength) of the unwanted pole number, or second, it may be offset by a whole wavelength (or a multiple of a whole wavelength) of the unwanted pole number and reversed (i.e. the direction of current(s) through the second group of windings is reversed). The substantially cancelled n-pole harmonic will have a wavelength. The coils of the second group may be displaced relative to the coils of the first group by half of that wavelength or by an odd, non-zero, integer multiple of half of that wavelength. Alternatively, the current(s) through the coils of the second group may be reversed relative to the current(s) through the coils of the first group and the coils of the second group may be displaced relative to the coils of the first group by that wavelength or a non-zero, integer multiple of that wavelength.

It will be understood that a coil of the first group corresponds to a coil of the second group if it is in the same position relative to the other coils in its group, ignoring any reversal or displacement.

The term "substantially cancelled" will be understood to cover not only the case in which the n-pole harmonic of the magnetic field is completely eliminated but also cases in which it is greatly reduced. Thus, the coils of the second group may be displaced relative to the coils of the first group by a distance that results in the n-pole harmonic having a magnitude that is less than 10%, less than 5%, or even less than 2% of the magnitude it would have if the coils of the first and second groups were aligned. Preferably, the n-pole harmonic is reduced sufficiently that its effect on the operation of the electromotive machine is negligible.

The cancelled substantially cancelled harmonic may for example be a dipole (2-pole) harmonic, a quadrapole (4-pole) harmonic, a 6-pole harmonic, an 8-pole harmonic or a 10-pole harmonic. It will be understood that a magnetic field can be analysed by separating the contribution of the component equal to the magnetic field from a magnetic dipole (a simple N-S magnet), the component equal to that of a magnetic quadrapole (two Ns and 2Ss, arranged NSNS or equivalently), and the components equal to those of poles of higher order. Summing the contribution of each of those components produces the total magnetic field that is actually observed.

Current may be supplied to the coils in three different phases, displaced from one another by 120 degrees of phase.

As set out above, although other definitions are possible, in the present description, the term "concentrated windings" is used to refer to a plurality of windings each arranged adjacent to, but not overlapping with, at least one other winding. Such an arrangement of the windings may be referred to as "planar concentrated windings". The primary windings of the present invention may be polyphase windings having a planar non-overlapping construction.

The rotor may comprise a conductive structure, for example a squirrel cage, plate, or secondary windings. The invention greatly improves the performance of many electromotive machines comprising conductive structures, because the coils of the offset stators produce a symmetrical waveform that does not contain even harmonics and produces substantial fields travelling only in one direction (small, backwards-going harmonics may be present). Consequently, the rotor does not suffer from problems arising from contrary travelling rotational fields. The rotor may comprise a permanent magnet.

The stator may comprise a ferrous core. The stator's core may be steel, for example laminated steel. The stator's core may define a plurality of slots. The concentrated windings may be seated in the slots. The slots may be open. The concentrated windings may be prefabricated. Prefabrication offers advantages including reduced production costs. Use of open slots is particularly convenient when using prefabricated windings, as the prefabricated windings may be placed directly in the slots.

The stator may be linear. The stator may be significantly longer than the rotor; for example, the stator may be more than twice, more than three times, or even more than ten times as long as the rotor. The rotor may be linear.

The stator may be cylindrical. The rotor may be cylindrical. The rotor may be cup-shaped. The first group of coils may be arranged around the inside of the cup. The second group of coils may be arranged around the outside of the cup.

The stator may be disc-shaped. The rotor may be disc-shaped.

The rotor may comprise a ferrous core. The rotor's core may be steel, for example laminated steel. The rotor's core may define a plurality of slots. Secondary windings may be seated in the slots. The slots may be open. The secondary windings may be plural windings, that is a plurality of windings each arranged adjacent to, and overlapping with, at least one other winding of the plurality. The secondary windings may be concentrated windings. The secondary windings of the rotor may be inductively energised polyphase windings.

At least some of the concentrated windings of the concentrated windings of said first and second groups of primary windings may be arranged as concentric coils. In one embodiment all of the concentrated windings are arranged as concentric coils. The said concentric coils may consist of two or more concentric coils. In one form of the invention, the outermost coils of the concentric coils of adjacent concentrated windings are located in a single slot of the rotor core. In an alternative form of the invention, the outermost coils of the concentric coils of adjacent concentrated windings are physically separated, for example by a divider, such as a tooth, provided in the slot of the rotor core.

The machine may be arranged to utilise power transferred in use from the primary to the secondary to power auxiliary mechanisms associated with the machine. For example, the transferred power may be utilised to run sources heat or light, for example in a traction vehicle in which the machine is comprised.

The force provided by the electromotive machine may be controlled by controlling displacement of the first group of windings from the second group of windings.

BRIEF DESCRIPTION OF THE DRAWINGS

Certain illustrative embodiments of the invention will now be described in detail, by way of example only, with reference to the accompanying schematic drawings, in which:

FIG. 3 is a portion of a stator for a concentrated winding, showing a coil, in (a) plan view and (b) side view;

FIG. 5 is the slot current distribution at two time instants for a double-layer winding;

FIG. 6 is the slot current distribution at two time instants for a concentrated winding;

FIG. 7 is a plot showing forward-going two-pole and backward-going 4-pole waves (a) at arbitrary time zero and (b) a quarter of a second later;

FIG. 11 is an example of a cylindrical electromotive machine according to an embodiment of the invention;

FIG. 12 shows (a) the phase behaviour of a concentrated winding, (b) a two-pole machine, using 3 coils and producing a forward-going 2-pole wave and a backward-going 4-pole wave, and (c) a 4-pole machine given by repeating the 3 coils of the 2 pole machine, which produces a 4-pole forward-going wave and an 8-pole backward-going wave.

FIG. 14 shows a portion of a stator comprising concentrated windings in (a) side view and (b) plan view.

FIGS. 1 to 7 and 12 are discussed above.

To eliminate the currents driven by unwanted harmonics, the harmonic magnetomotive forces (mmfs) can themselves be eliminated in the case of a double-sided machine, that is a machine comprising a stator comprising a first group of primary windings arranged on a first side of the rotor and a second group of primary windings arranged on a second, opposite, side of the rotor. For convenience, the portion of the stator comprising the first group and the portion of the stator comprising the second group are referred to in the following description as if they were distinct stators.

In example embodiments of the invention, the stators are offset or offset and reversed so that the unwanted fields from the two sides are in opposition whilst the wanted fields reinforce.

Figure 1:
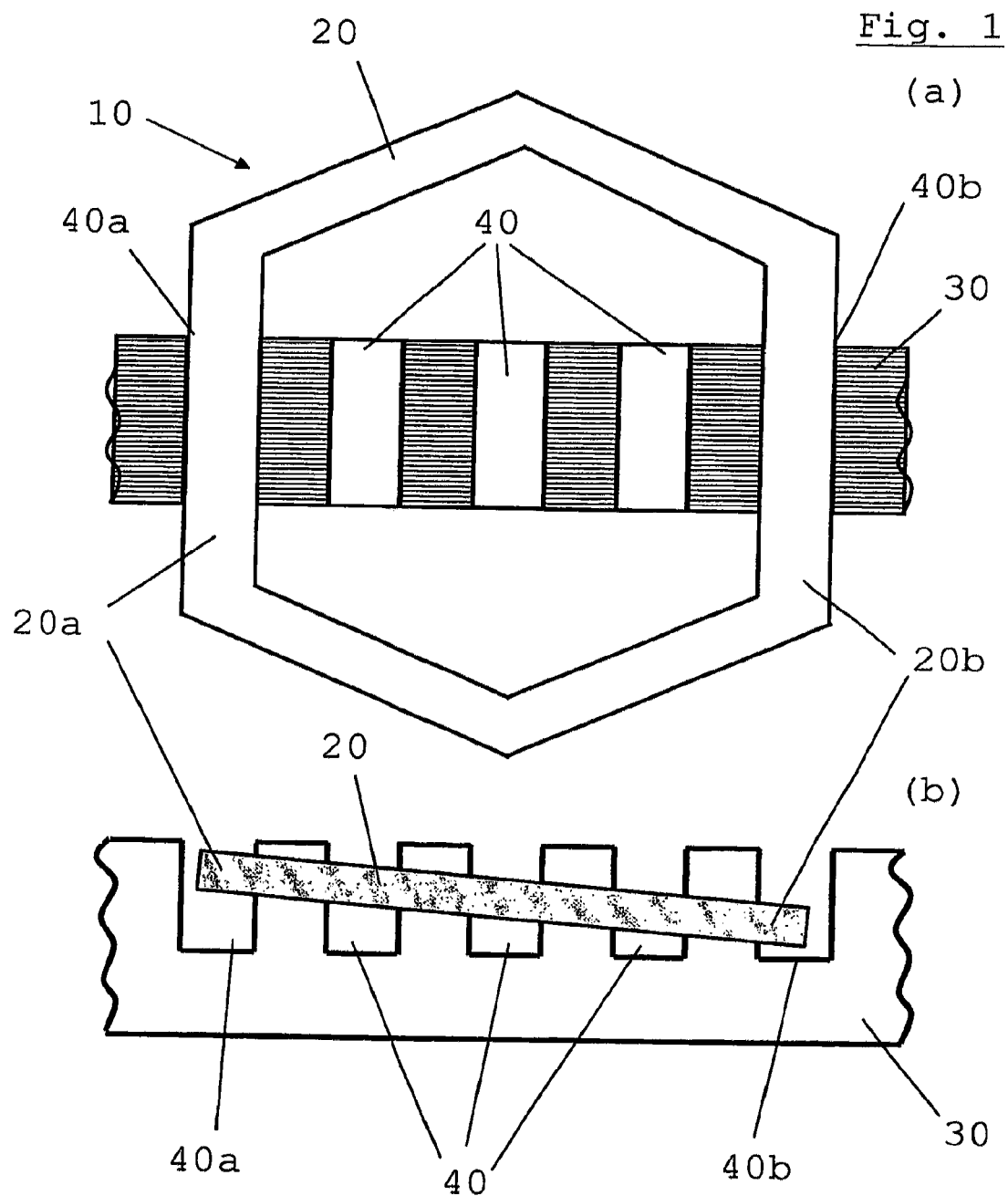
FIG. 1 is a portion of a stator for a double-layer winding, showing a coil, in (a) plan view and (b) side view.
Figure 2:
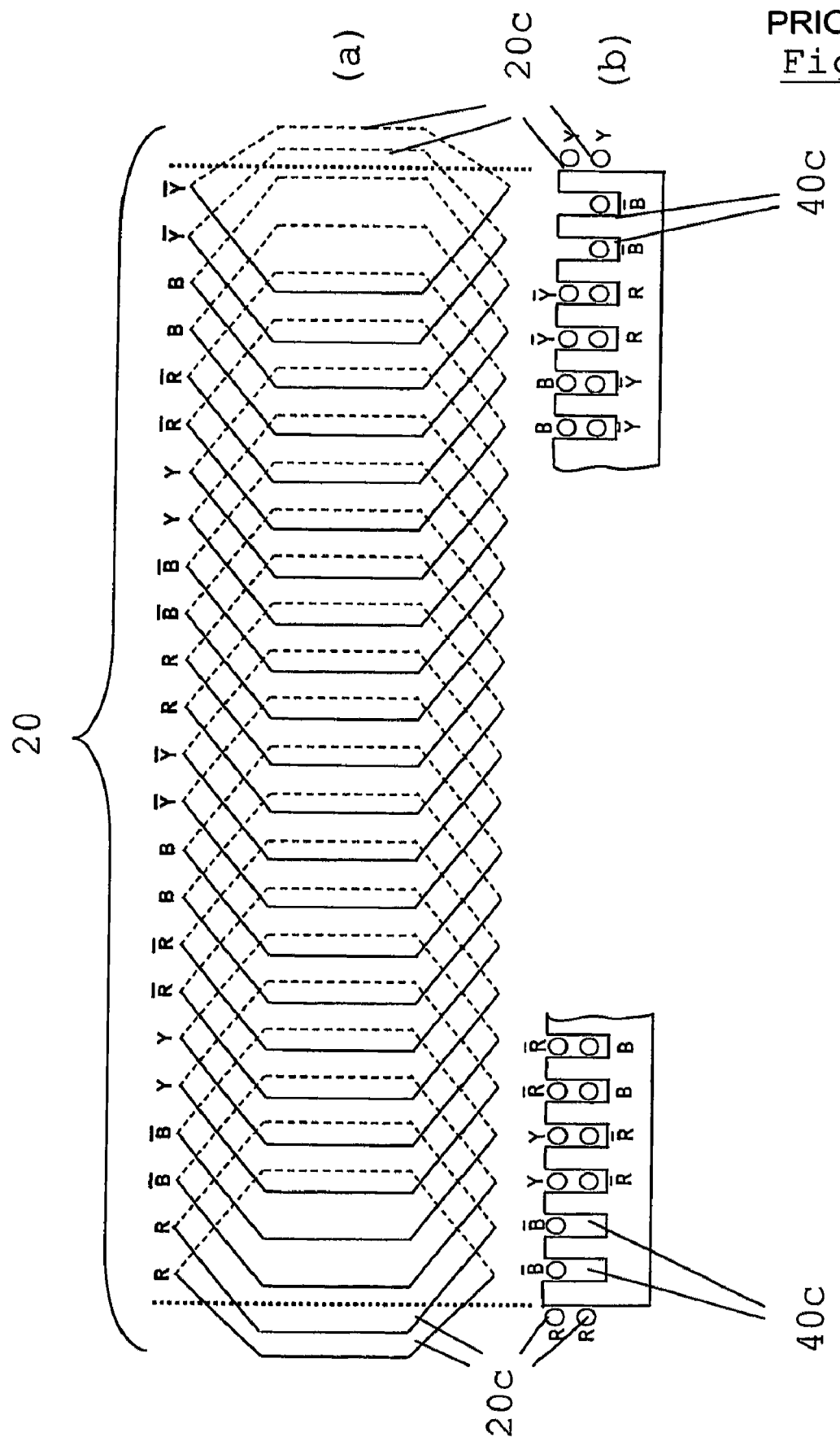
FIG. 2 is (a) a plan view of the arrangement of coils in the stator of FIG. 1, and (b) a part longitudinal cross-sectional view of stator.
Figure 4:
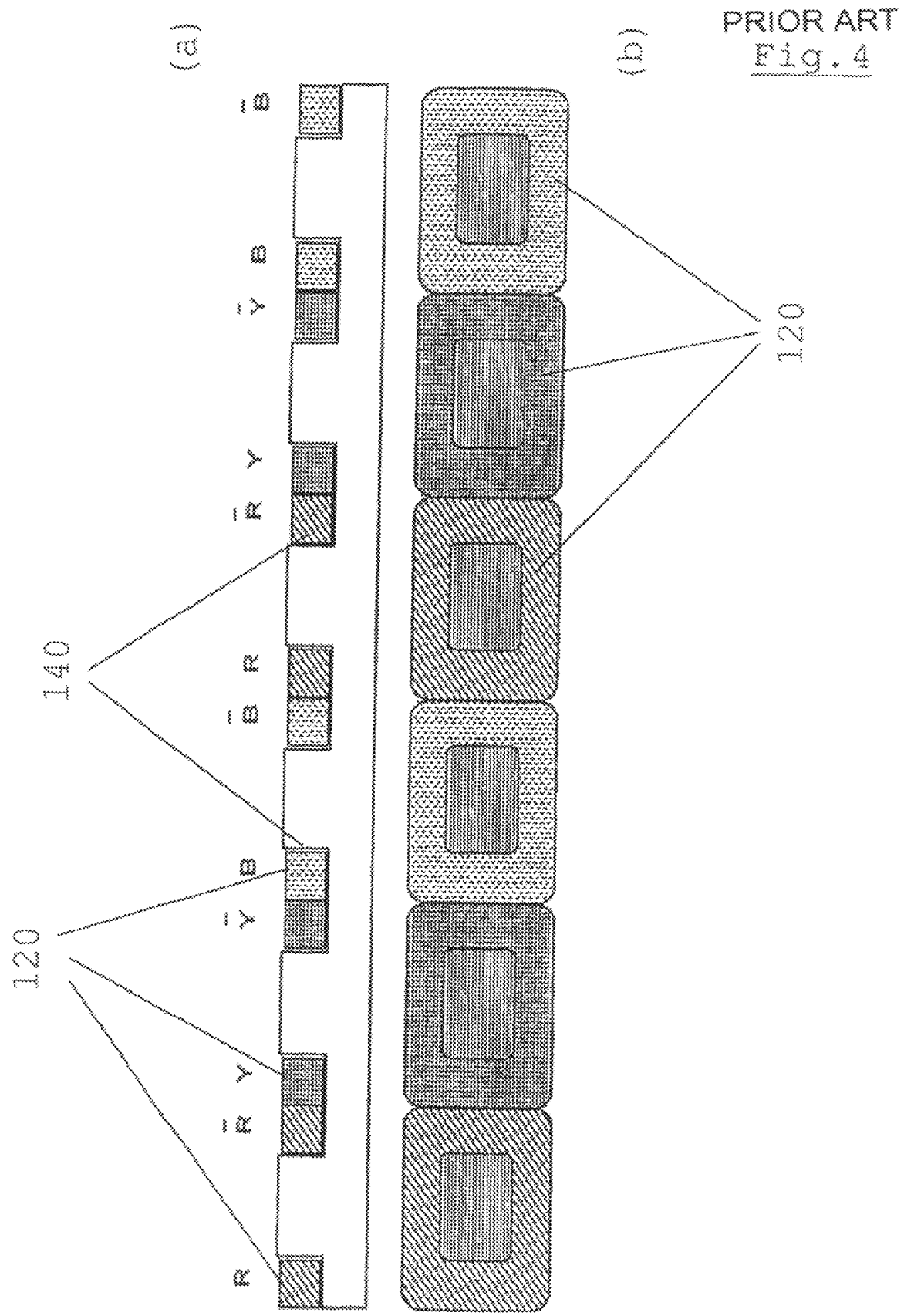
FIG. 4 is a four-pole linear machine using a concentrated winding, in (a) longitudinal cross-sectional view, and (b) plan view.
Figure 8:
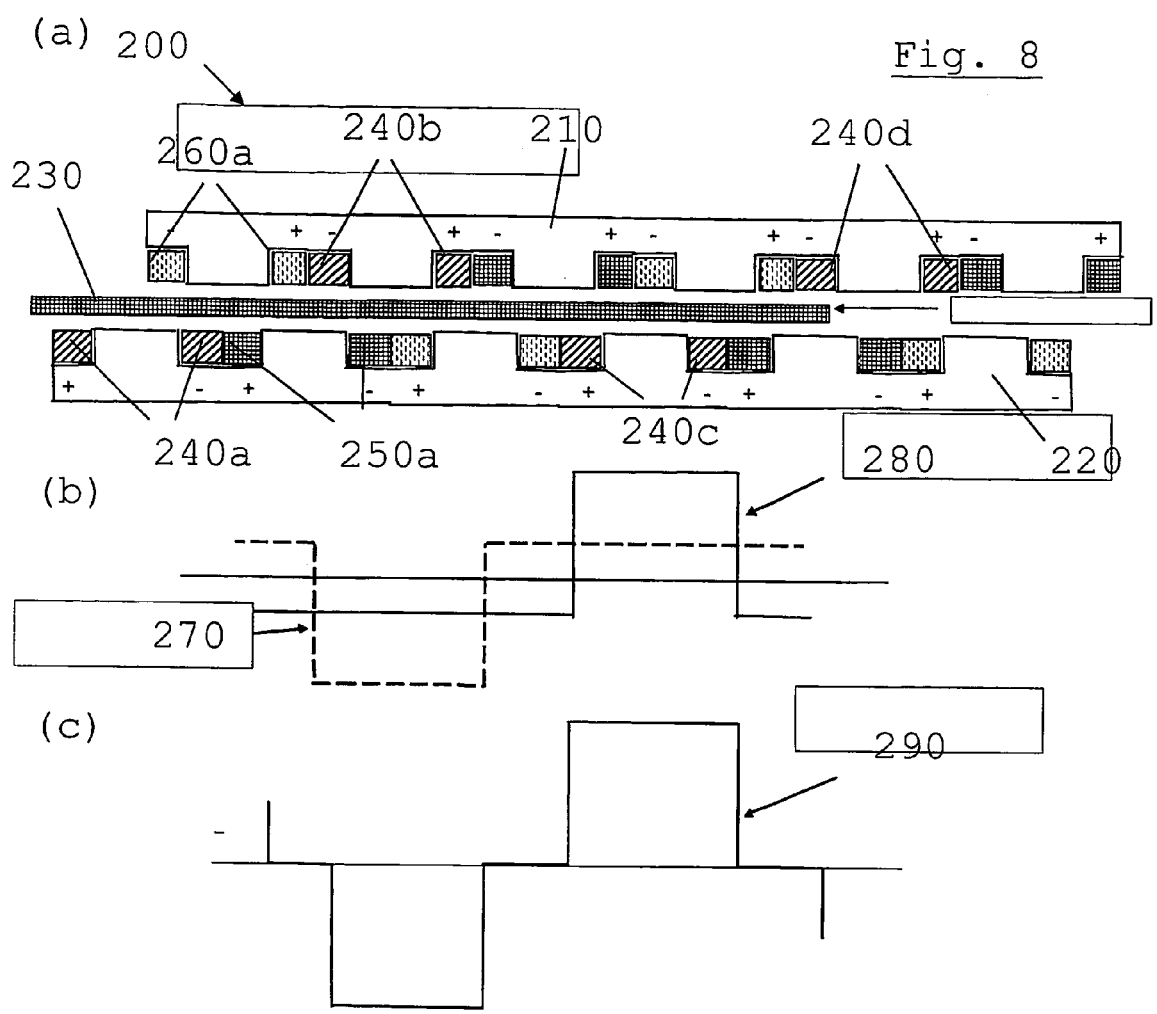
FIG. 8 is (a) an example of a "non-aligned" linear electromotive machine according to an embodiment of the invention, (b) the wave induced by red-phase windings in upper and lower stators of said machine, (c) the summed, net wave induced, (d) & (e) the flux lines in (respectively) the aligned and non-aligned electromotive machines (f) & (g) graphs of the normal flux down the centre of the air gap, at three successive time intervals (phases 0, π/3, 2π/3), in (respectively) the aligned and non-aligned machines); and (h) the thrust and normal force obtained as the two stators of the machine are offset by different amounts from their optimum displacement.
Figure 8:
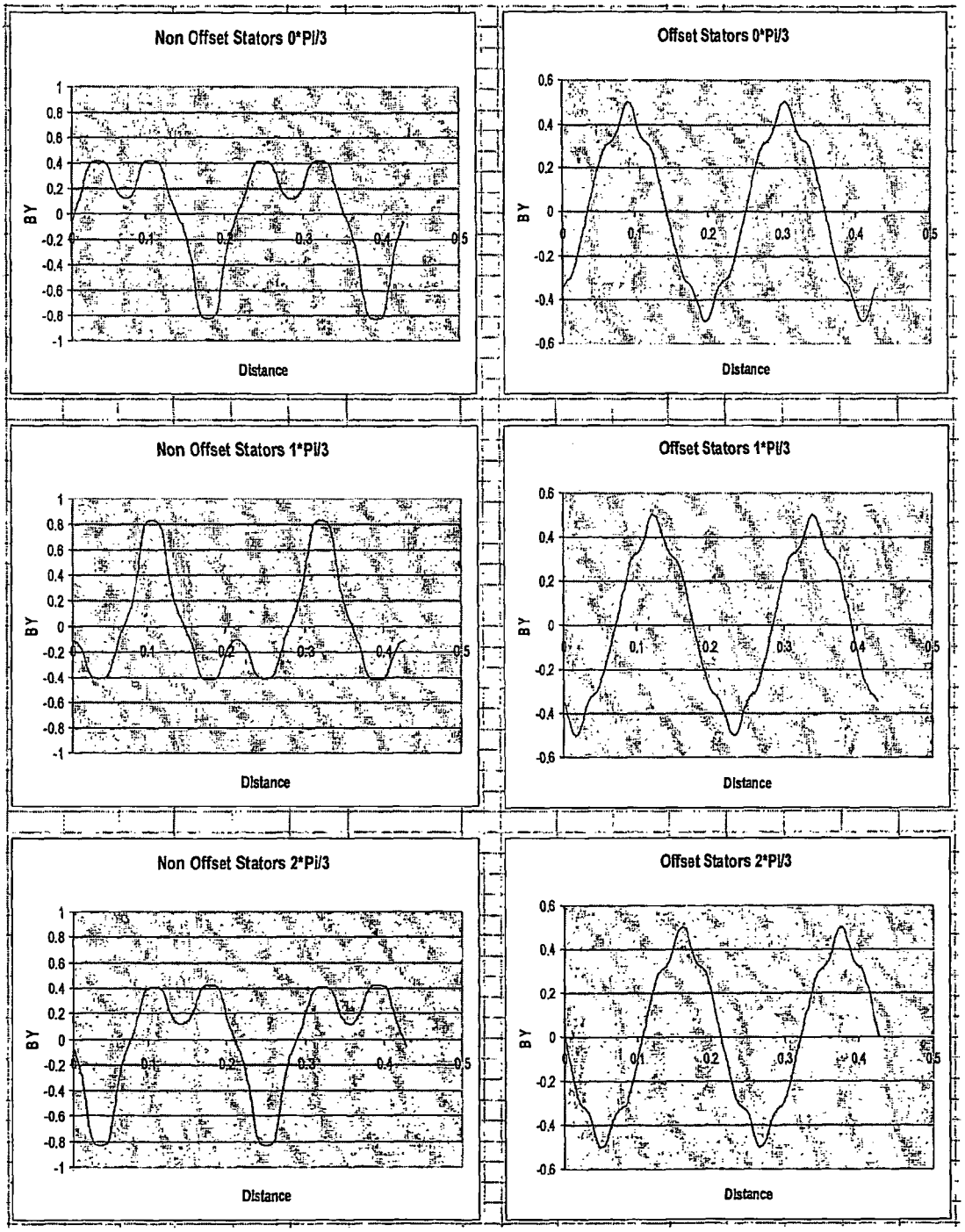
Figure 8:
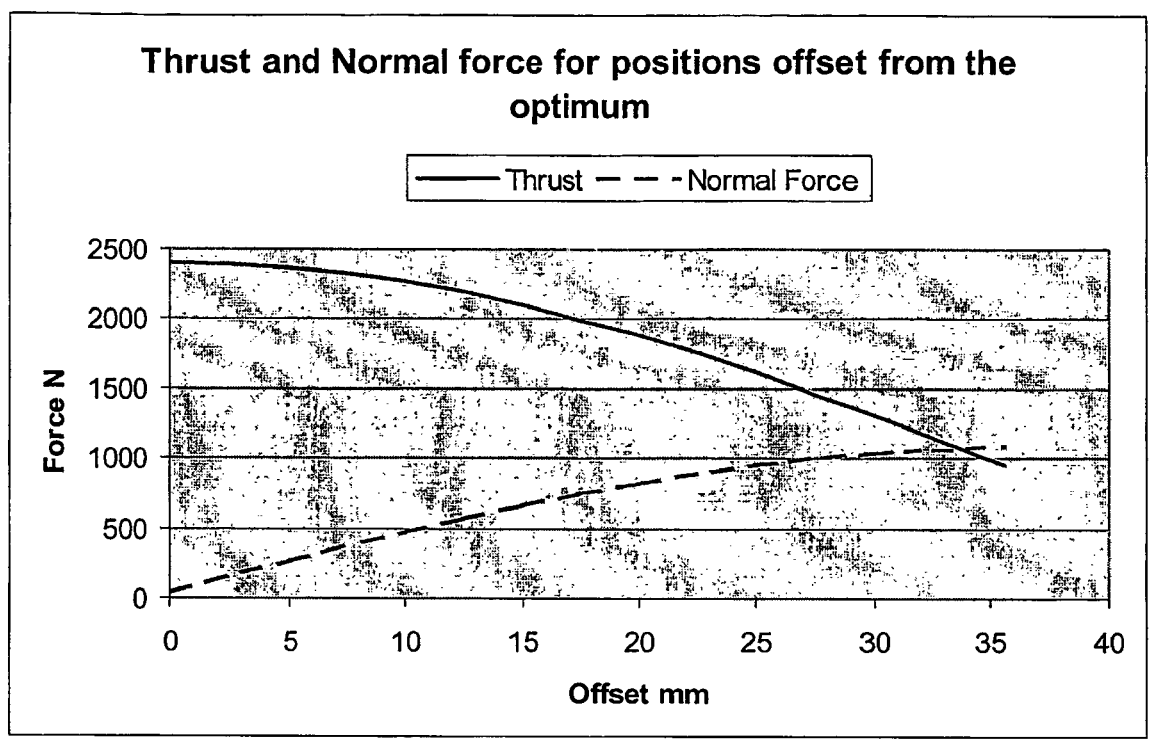

The arrangement is shown at FIG. 8(a). Linear electromotive machine 200 comprises a top stator 210 and a bottom stator 220. Each stator includes a group of concentrated winding coils which are arranged successively along the stator's length. The coils are driven by a three-phase supply: red, yellow and blue. The coils are arranged so that, in each of the top stator 210 and the bottom stator 220, successive adjacent coils are red, yellow and blue in sequence, so that every third coil in a stator 210, 220 has the same phase. The first group of coils in the upper stator 210 is displaced relative to the coils in the lower stator 220 by half the distance between successive coils of the same colour within the top stator 210 (which is also the distance between successive coils of the same colour within the bottom stator 220). Thus, to take the red phase as an example, the distance from the first red coil 240a from the left-hand end of stator 220 in FIG. 8 to the second red coil 240c from the left-hand end of stator 220, is twice the distance from the first red coil 240a from the left-hand end of stator 220 to the first red coil 240b from the left-hand end of stator 210. Similarly, each yellow coil and each blue coil (starting, for example, with yellow coil 250a in stator 220 and with blue coil 260a in stator 210) is separated from the next coil of the same colour in the same stator by twice its separation from the next coil of the same colour in the other stator.

The current through the coils of the upper stator 210 is reversed relative to that through the coils of the lower stator 220.

In this example, the upper stator 210 has been displaced by 1.5 slot pitches, which is one wavelength of an 8-pole wave, and the current through it has been reversed, so that the 8-pole wave is eliminated from the sum, leaving a total mmf wave that has four poles in the length of machine 200.

FIG. 8(h) shows the results of a finite-element analysis of the effects of varying the offset of stator 210 from stator 220. At optimal displacement (an offset of 0 mm), the thrust obtained in 2500 N and the normal force produced is 0N. That behaviour deteriorates monotonically as the offset is increased, until at around 24 mm the thrust and normal force are equal to each other and about 1100 N. It is clear that the offset does not need to be exact in order to achieve a beneficial effect on the behaviour of machine 200. The force depends on the displacement but not so critically that production tolerance would be difficult. Interestingly, FIG. 8(h) makes clear that one could control the force provided by an electromotive machine by controlling the stator offset.

FIG. 8(b) shows the red-phase mmf 270 from top stator 210 and the red-phase mmf 280 from bottom stator 220. FIG. 8(c) shows the net red-phase mmf 290. The result is a symmetrical waveform 290 that does not contain even harmonics and will not produce substantial backward going fields. It follows that the machine can operate with a plate rotor 230, without unwanted effects from wrongly directed fields.

A pair of flux line pictures for the aligned and offset cases of the double-sided machine is given at FIGS. 8(d) and (e), respectively. The aligned stators produce a field that looks complex, because of the large harmonic content; in contrast, the offset stator field lines show a clear 4-pole pattern. FIGS. 8(f) and (g) are graphs of numerical simulations of the normal flux down the centre of the air-gap of aligned and offset machines, at progressive time intervals. In the aligned case, the changing shape of the curve shows clearly that higher harmonics are present; in contrast, in the offset case, the curve shows a travelling wave that retains its shape at successive time intervals.

Figure 9:
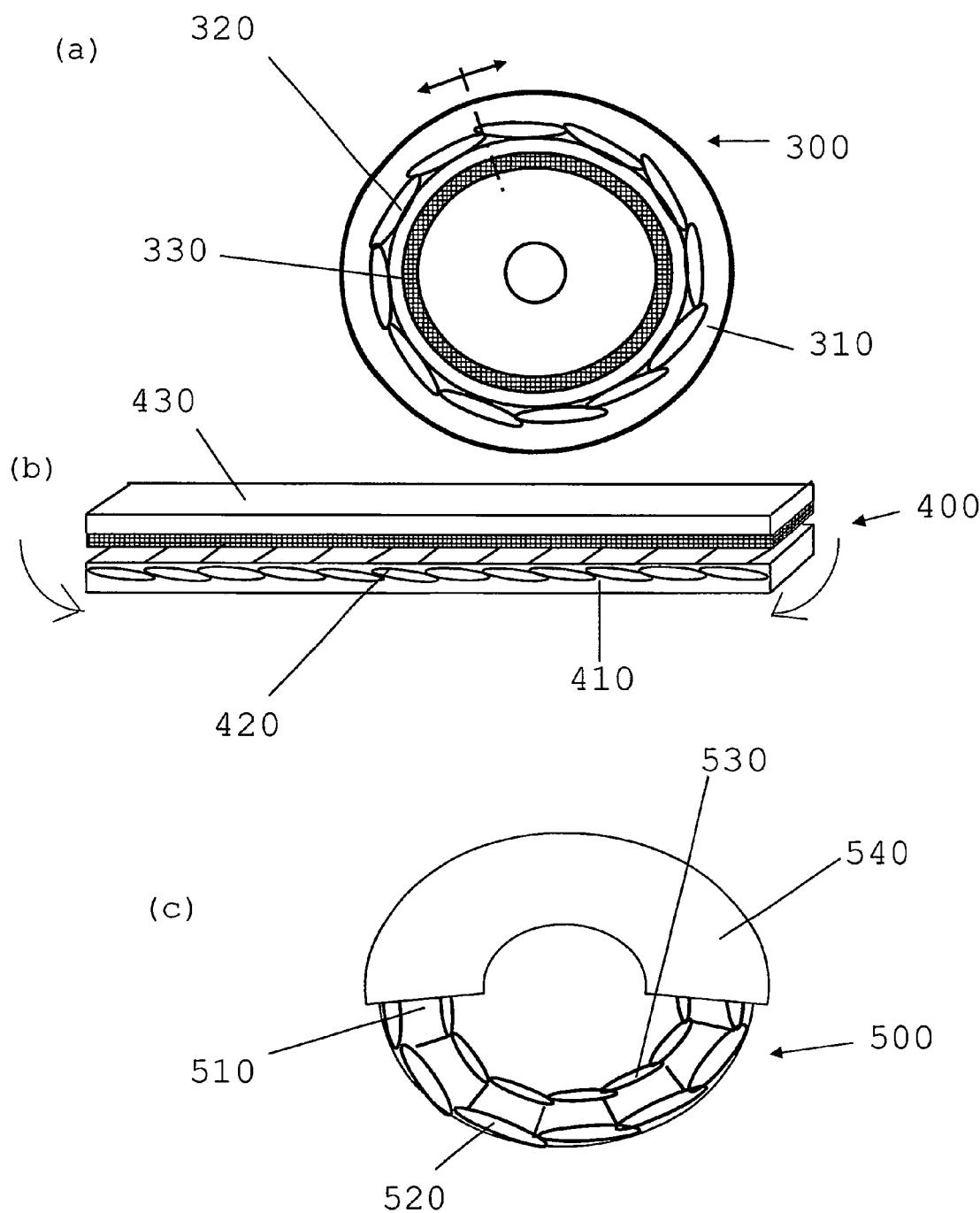
FIG. 9 illustrates the topological relationship between (a) a cylindrical stator, (b) a linear stator, and (c) a disc stator.

Cylindrical, disc and linear versions of a given electromotive machine can be formed by topological changes, as illustrated in FIG. 9. FIG. 9(b) shows a stator 400 for a linear machine, including a layer 420 of concentrated windings and a ferrous-core layer 410. the linear machine has a plate rotor 430.

FIG. 9(a) shows how the linear machine can be topologically wrapped into a circle to form a related cylindrical machine. The rotor 330 is cylindrical and sits within the stator cylinder 300, perpendicular to the plane of FIG. 9(b). Concentrated windings 320 form an inner layer of the cylinder 300; ferrous core 310 forms an outer layer.

FIG. 9(c) shows a machine having a double-sided stator disc 500. The rotor 540 has the shape of an annular disk and lies in a plane parallel to that of FIG. 9(c). Concentrated winding layers 520 and 530 form, respectively, an outer ring and an inner ring of an annular disc. Ferrous core 510 forms a ring intermediate between inner ring 520 and outer ring 530.

Figure 10:
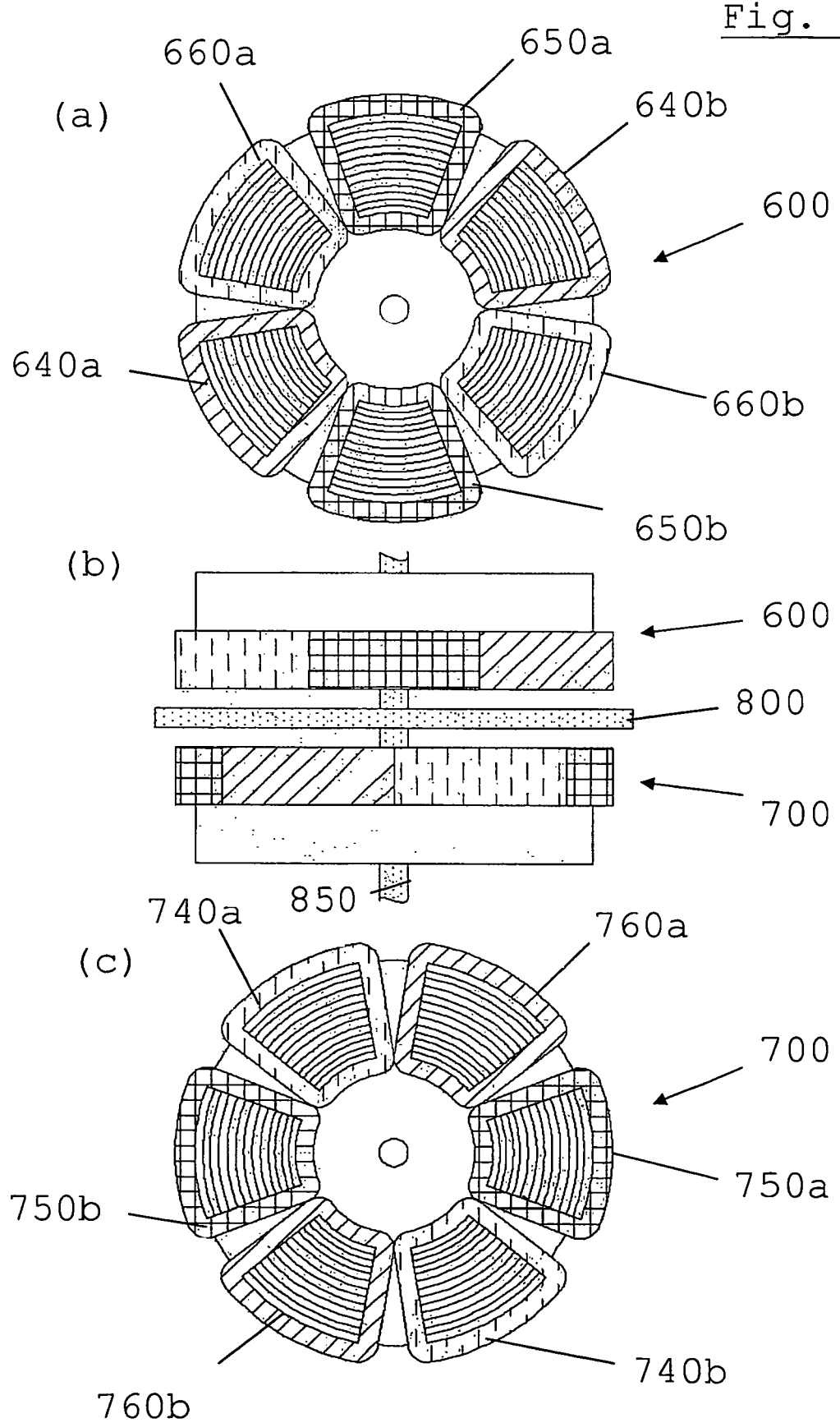
FIG. 10 is an example of a disc electromotive machine according to an embodiment of the invention.

FIG. 10 shows an example of a machine embodying the invention: a double-sided offset stator disc machine that is being considered for duty as an induction generator. The machine comprises an upper stator 600 and a lower stator 700. Each stator 600, 700 is disc-shaped and each includes group of windings comprising a ring of concentrated-winding coils 640a,b, 650a,b, 660a,b and 740a,b, 750a,b and 760a,b. Coil pairs having the same phase (which are labelled with the same reference numeral in FIG. 10, e.g. pair 640a and 640b) are arranged opposite each other within the ring, so that in a clockwise direction the coils are arranged: in the upper stator 600—red coil 640a, blue coil 660a, yellow coil 650a, red coil 640b, blue coil 660b, yellow coil 650b; and in the lower stator 700—red coil 740a, blue coil 760a, yellow coil 750a, red coil 740b, blue coil 760b, yellow coil 750b.

In the machine, upper stator 600 and lower stator 700 are mounted with the coils of each stator facing those of the other, but the stators are rotated relative to each other by half a wavelength (that is 90 degrees, as coils of the same phase within the same stator are 180 degrees apart).

Disc rotor 800 is mounted on axle 850 and arranged between the stators 600, 700. Because the coils of the stators 600, 700 are offset, they produce a symmetrical waveform that does not contain even harmonics and produces substantial fields travelling only in one rotational direction. Consequently, disc rotor 800 can be a plate without problems arising from contrary travelling rotational fields.

FIG. 11 shows another example of a machine embodying the invention: a double-sided cylindrical machine 900 that may find duty as a high torque drag-cup servo machine. Machine 900 comprises a stator 910 and a rotor 920.

Stator 910 comprises a cylindrical inner stator 912 and a cylindrical outer stator 917, both mounted on stator support structure 940. Rotor 920 comprises a cylindrical plate 950, mounted on rotor support structure 960. Rotor support structure 960 is itself mounted on stator support structure 940 such that the rotor support structure 960, and hence the plate 950, is free to rotate relative to the stator support structure 940, and hence the inner stator 912 and the outer stator 917. Cylindrical inner stator 912 sits inside the cylindrical rotor plate 950, which in turn sits inside cylindrical outer stator 917.

Again, the concentrated-winding coils of the outer stator 917 are (angularly) displaced relative to those of the inner stator 912 by half a wavelength, that is half the distance between coils of the same phase in the same stator 912, 917. The outer stator 917 is thus displaced by 90 degrees relative to the inner stator 912, as coils of the same phase are arranged opposite each other within each stator 912, 917. Inner stator 912 has, clockwise in FIG. 11(b) red-phase coil 941a, blue-phase coil 947a, yellow-phase coil 943a, red-phase coil 941b, blue-phase coil 943b, and yellow-phase coil 947b. Outer stator 917 has, clockwise in FIG. 11(b) red-phase coil 930a, blue-phase coil 937a, yellow-phase coil 933a, red-phase coil 930b, blue-phase coil 937b, and yellow-phase coil 933b. Blue-phase coil 937a in outer stator 917 is aligned halfway between yellow-phase coil 947b and red-phase coil 941a, and the other coils in each stator 912, 917 are aligned accordingly.

The force produced by an electromotive machine is proportional to the winding area of the stator. The winding area is defined as the area of the core slots filled with copper divided by the slot area. A double-wound stator typically has a winding area of 0.4 to 0.5; a concentrated-wound stator typically has a winding area of about 0.7. Concentrated windings permit, for example by permitting utilisation of the space typically wasted at the ends of a double winding, an improvement of about 40% in the force produced; alternatively, a given force from double-windings can be produced from a reduced number of concentrated windings, which means for a reduced cost.

An experimental offset double-sided machine has been made and tested. The force and input voltage and current compare well with a double-sided machine using production stators of the same size. In an improved version, more conductors can be packed into the slots in the stator, thanks to the simple non-overlapping form of concentrated windings; that will provide a machine with considerably more force than the conventional double-sided machine and with reduced assembly costs.

In our experiments, at the point of optimum offset, a prototype machine according to the invention gave the same standstill force as that produced by a pair of conventional production machines of the same size. The advantage of the new machine lies in an estimated reduction in production costs of 20%. This experimental machine did not take advantage of the increase in copper slot content that is possible.

Figure 13:
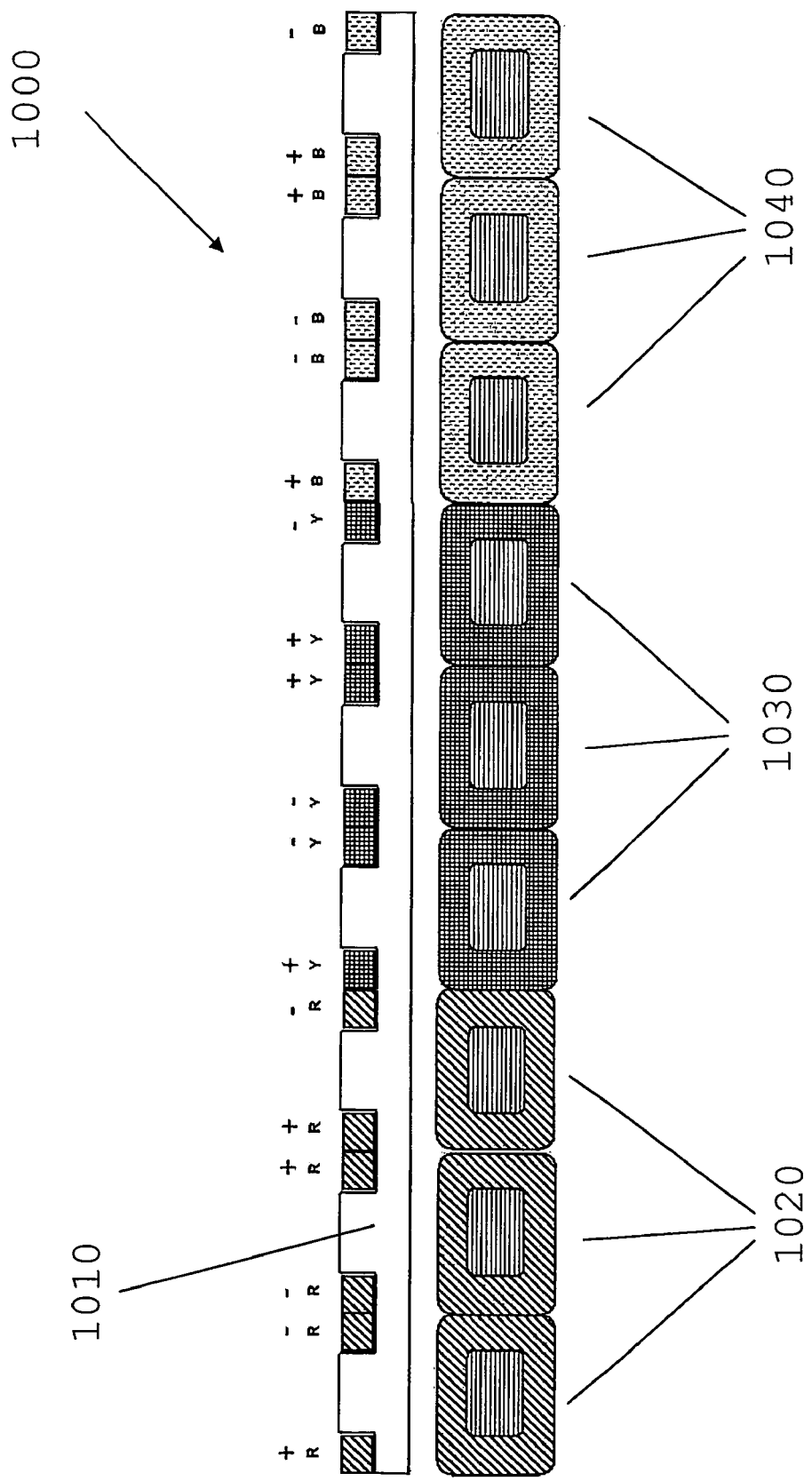
FIG. 13 is another example of a stator for use in a machine that is an example embodiment of the present invention.

Many different arrangements of concentrated winding are possible. For example, FIG. 13 shows a stator 1000 comprising a slotted stator 1010 and three sets of three concentrated windings 1010, 1020, 1030. Each set is connected to a different phase of a three-phase supply. Each coil portion that shares a slot with a portion of another coil having the same phase has current flowing in the same direction as the current in the other coil; each coil portion that shares a slot with a portion of another coil having a different phase has current flowing in the opposite direction as the current in the other coil. This 9-slot (coil) array has equal conductor distributions at both 8 and 10 poles and may be used for either according to the rotor pole number. Thus, the stator 1010 may be paired with another similar stator which is arranged to cancel either the 8-pole or 10-pole field as desired, by displacing or displacing and reversing the coils 1010, 1020, 1030 by an distance that leads to destructive interference of one or other of those fields.

Figure 18:
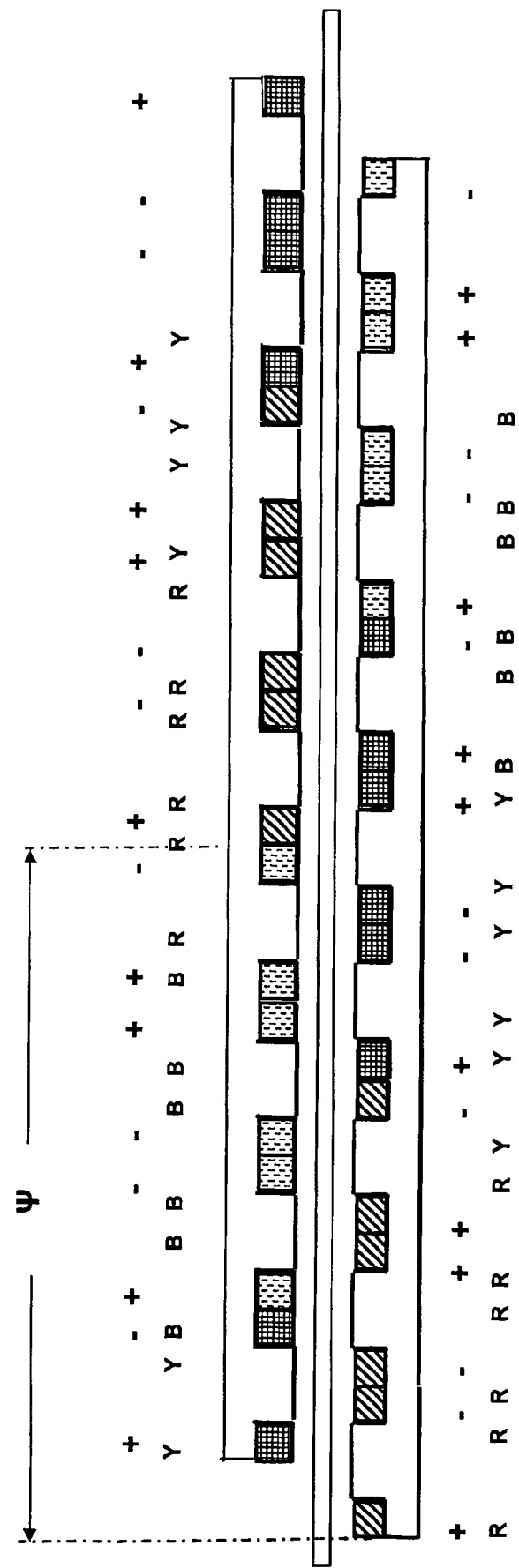
FIG. 18 is an example of a "non-aligned" linear electromotive machine according to an embodiment of the invention.

As an example FIG. 18 shows a pair of stators offset by an angle $\Psi$ which is given by 5 pole-pitches (2.5 wavelengths) of a 10 pole field so that this field is eliminated leaving the 8 pole component.

The quality of the linear machines described above has been assessed by both finite element based modelling and practical tests. The broad conclusions that have been reached are:

The force produced by the machines is equal to that produced by conventional machines.
The input volt-amperes (VA) are greater than in conventional machines The increase in input VA can be a disadvantage since it directly affects the size and cost of the power supply required. In machines that are inverter fed this can be quite crucial since that cost of the inverter is usually greater than that of the machine. In machines that are mains fed the impact is less but the higher cable costs involved can be important.

The increased input VA requirement is due to two factors:
An increase in magnetising current due to a reduced magnetising reactance.
An increase in the stator winding end turn leakage reactance.

The leakage reactance increase is due to the reduced number of coils in a phase winding. This can be argued in a simplistic way by taking a two pole machine as an example. In a two pole machine the conventional machine would generally have two coils per phase group and a total of four coils per phase. In comparison the winding using planar concentrated coils would have only one coil per phase. It follows that the coil in the planar concentrated coil winding would have about four times the turn number (to get the same induced emf) and of the order of 16 times the reactance of a coil in the conventional winding. Then using the number of coils in each case it is apparent that the end winding reactance will be four times in the planar concentrated winding case.

The increase in magnetising current is due to the increase in effective magnetic gap in the planar concentrated winding case. This is due to the increase in the size of the slot openings. Taking again the comparison above the total number of slots is 3 for the planar concentrated case and 12 for the conventional. If the pole-pitch is the same it follows that the slot openings will be of the order of 4 times greater in the planar concentrated case. This leads to increased perturbation of the air gap flux by the slots and a greater mmf drop across the gap so that the magnetic gap is increased.

Figure 15:
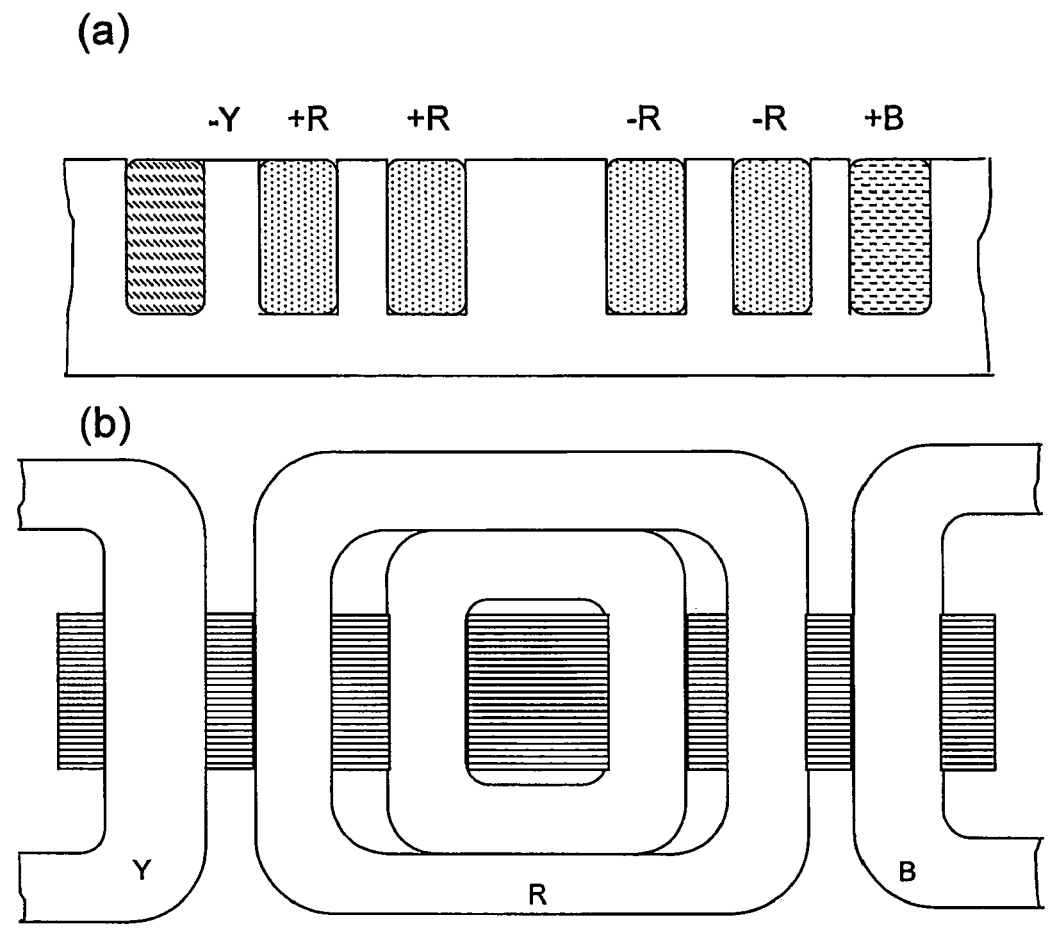
FIG. 15 shows a portion of a stator comprising concentrated windings in (a) side view and (b) plan view.
Figure 16:
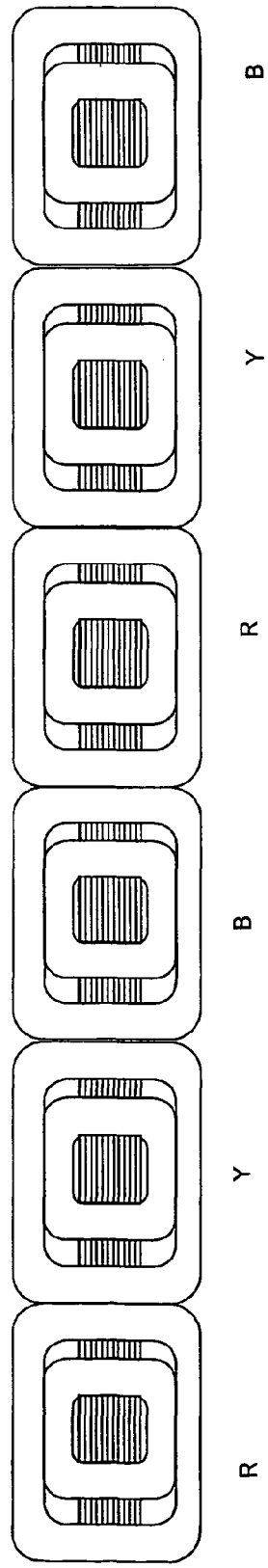
FIG. 16 is a plan view of a 4-pole winding using the arrangement of FIG. 14.
Figure 17:
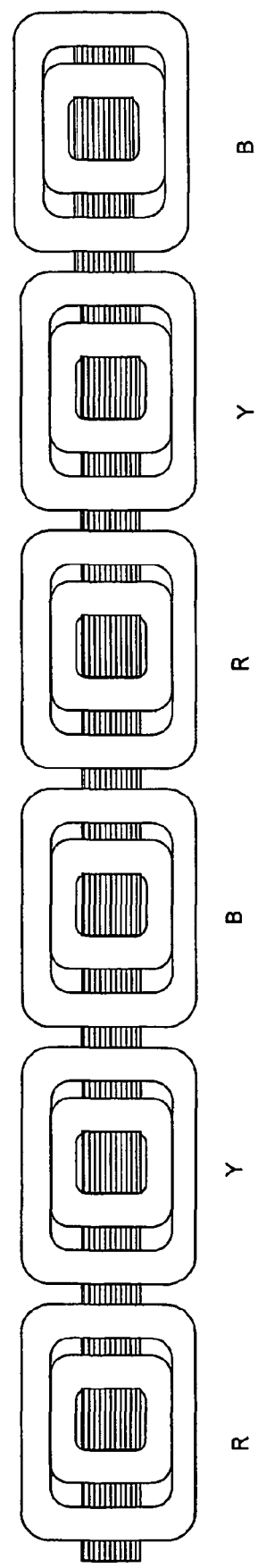
FIG. 17 is a plan view of a 4-pole winding using the arrangement of FIG. 15.

The VA input to all the machines described above can be reduced by substituting a planar group of concentric coils for each of the planar concentrated coils. This effectively subdivides the concentrated coils. The groups are further characterised by not overlapping adjacent groups and being connected in a R Y B sequence. FIG. 14 shows a drawing of a group with two concentrics in which the outermost coil sides from adjacent groups occupy the same slot. FIG. 15 shows a similar arrangement that has a tooth between the outermost coil sides from adjacent groups. FIGS. 16 and 17 show the assembly of groups required for a 4-pole winding using the arrangement of FIGS. 14 and 15 respectively. Whilst the above examples are drawn for two coils in a concentric group it will be understood that any number of coils in a group is possible. The same technique can of course be applied to any of the modular windings for example the planar concentrated coils of the arrangement described above with reference to FIG. 13.

Whilst the present invention has been described and illustrated with reference to particular embodiments, it will be appreciated by those of ordinary skill in the art that the invention lends itself to many different variations not specifically illustrated herein. For that reason, reference should be made to the claims for determining the true scope of the present invention.

The invention claimed is:

1. A machine comprising a rotor and a stator, the machine is a polyphase induction electromotive machine, the stator comprises:
   (i) a first group of primary, concentrated windings, arranged on a first side of the rotor; and
   (ii) a second group of primary, concentrated windings, arranged on a second, opposite, side of the rotor;
   wherein the primary windings of each group comprise a plurality of coils which, in use each carry current(s) and produce a magnetic field, the coils of the second group being in a displaced position relative to the coils of the first group, so that corresponding coils of each group are not aligned and an n-pole travelling harmonic of the magnetic field is substantially cancelled, where n is a positive, even integer, and (a) the substantially cancelled n-pole travelling harmonic has a wavelength and the coils of the second group are displaced relative to the coils of the first group by half of that wavelength or by an odd, non-zero, integer multiple of half of that wavelength or (b) the substantially cancelled n-pole travelling harmonic has a wavelength and the current(s) through the coils of the second group are reversed relative to the currents(s) through the coils of the first group and the coils of the second group are displaced relative to the coils of the first group by that wavelength or a non-zero, integer multiple of that wavelength.

2. A machine as claimed in claim 1, wherein the coils of the second group are displaced relative to the coils of the first group by a distance that results in the n-pole travelling harmonic having a magnitude that is less than 10% of the magnitude it would have if the coils of the first and second groups were aligned.

3. A machine as claimed in claim 1, in which current is supplied to the coils in three different phases, displaced from one another by 120 degrees of phase.

4. A machine as claimed in claim 1, in which the rotor comprises a conductive structure.

5. A machine as claimed in claim 1, in which the stator comprises a ferrous core.

6. A machine as claimed in claim 1, in which the stator comprises a core defining a plurality of slots.

7. A machine as claimed in claim 6, in which the concentrated windings are seated in the slots.

8. A machine as claimed in claim 6, in which the slots are open.

9. A machine as claimed in claim 1, in which the concentrated windings are prefabricated.

10. A machine as claimed in claim 1, in which the stator is linear.

11. A machine as claimed in claim 1, in which the stator is more than twice as long as the rotor.

12. A machine as claimed in claim 1, in which the rotor is linear.

13. A machine as claimed in claim 1, in which the stator is cylindrical.

14. A machine as claimed in claim 1, in which the rotor is cylindrical.

15. A machine as claimed in claim 14, in which the rotor is in a shape of a cup.

16. A machine as claimed in claim 15, in which the first group of coils is arranged around the inside of the cup.

17. A machine as claimed in claim 15, in which the second group of coils is arranged around the outside of the cup.

18. A machine as claimed in claim 1, in which the stator is in a shape of a disc.

19. A machine as claimed in claim 1, in which the rotor is in a shape of a disc.

20. A machine as claimed in claim 1, wherein at least some of said concentrated windings of said first and second groups of primary windings are arranged as concentric coils.

21. A machine as claimed in claim 20, wherein the concentric coils include outermost coils of adjacent concentrated windings which are located in a single slot of a core of the stator.

* * * * *